(12) United States Patent
Campbell

(10) Patent No.: US 9,992,694 B2
(45) Date of Patent: *Jun. 5, 2018

(54) SYSTEM AND METHOD OF RELEASING RESOURCES IN A TELECOMMUNCATIONS NETWORK

(71) Applicant: Telefonaktiebolaget L M Ericsson (publ), Stockholm (SE)

(72) Inventor: Loudon Lee Campbell, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 656 days.

This patent is subject to a terminal disclaimer.

(21) Appl. No.: 14/547,330

(22) Filed: Nov. 19, 2014

(65) Prior Publication Data

US 2015/0124582 A1 May 7, 2015

Related U.S. Application Data

(62) Division of application No. 12/997,080, filed as application No. PCT/IB2009/005562 on May 11, 2009, now Pat. No. 8,908,497.

(Continued)

(51) Int. Cl.
  *H04W 24/04* (2009.01)
  *H04W 76/06* (2009.01)
  (Continued)

(52) U.S. Cl.
  CPC ......... *H04W 24/04* (2013.01); *H04W 76/064* (2013.01); *H04W 28/04* (2013.01);
  (Continued)

(58) Field of Classification Search
  CPC .... H04W 24/04; H04W 76/064; H04W 28/04
  See application file for complete search history.

(56) References Cited

U.S. PATENT DOCUMENTS 7,330,425 B1  2/2008  Gulati et al.
8,908,497 B2 * 12/2014  Campbell ........... H04W 76/064
                                                    370/216

(Continued)

FOREIGN PATENT DOCUMENTS

WO  WO 01/62030    8/2001
WO  WO 2004/043086 5/2004

(Continued)

OTHER PUBLICATIONS

3GPP TS 23 401 V8.5.0 (Mar. 2009) 3rd Generation Partnership Project: Technical Specification Group Services and System Aspects: General Packet Radio Service (GPRS) enhancements for Evolved Universal Terrestrial Radio Access Network (E-UTRAN) access (Release 8), Mar. 2009.

(Continued)

*Primary Examiner* — Siming Liu
(74) *Attorney, Agent, or Firm* — Baker Botts, LLP

(57) ABSTRACT

A system, method, and node for releasing resources in a telecommunications network. The method begins by a node assigning a resource-Identification (ID) to an internal resource within the node. At least one internal resource is allocated by the node for a specific Packet Data Network (PDN) connection. Next, a first message containing a resource-ID of the allocated internal resource is sent to one or more peer nodes. The peer nodes store the received resource-ID from the first message. When a node determines that a malfunction of the allocated internal resource of the node occurs, the node sends a second message containing the resource-ID of the malfunctioning internal resource to the peer nodes. The peer nodes then tear down the PDN connection.

19 Claims, 17 Drawing Sheets

Related U.S. Application Data

(60) Provisional application No. 61/059,998, filed on Jun. 9, 2008.

(51) Int. Cl.
    *H04W 28/04*     (2009.01)
    *H04W 72/00*     (2009.01)
    *H04W 72/04*     (2009.01)
    *H04W 88/16*     (2009.01)

(52) U.S. Cl.
    CPC ............ *H04W 72/00* (2013.01); *H04W 72/04* (2013.01); *H04W 88/16* (2013.01)

(56) References Cited

U.S. PATENT DOCUMENTS

| | | |
|---|---|---|
| 2002/0168984 A1 | 11/2002 | Wallentin |
| 2003/0031159 A1 | 2/2003 | Sayeedi et al. |
| 2005/0018599 A1 | 1/2005 | Mahasoom et al. |
| 2005/0143027 A1 | 6/2005 | Hiddlink et al. |
| 2009/0238207 A1 | 9/2009 | Zhao et al. |

FOREIGN PATENT DOCUMENTS

| | | | | |
|---|---|---|---|---|
| WO | WO 2005/079100 | | 8/2005 | |
| WO | WO 2005079100 A1 | * | 8/2005 | .......... H04W 76/041 |
| WO | WO 2009150499 A1 | * | 12/2009 | .......... H04W 76/064 |

OTHER PUBLICATIONS

International Search Report for PCT/IB2009/005562, dated Sep. 10, 2009.
Written Opinion for PCT/IB2009/005562, dated Sep. 10, 2009.
European Patent Office "Communication Pursuant to Article 94(3) EPC", Application No. 09 762 029.8-1857, 6 pages, May 23, 2016.
European Patent Office "Communication Pursuant to Article 94(3) EPC", Application No. 09 762 029.8-1857, 4 pages, Nov. 17, 2015.

* cited by examiner

Go to FIG. 15B

SYSTEM AND METHOD OF RELEASING RESOURCES IN A TELECOMMUNCATIONS NETWORK

PRIORITY

This nonprovisional application is a divisional application under 35 U.S.C. § 121 of U.S. patent application Ser. No. 12/997,080, entitled "A System and Method of Releasing Resources in a Telecommunication Network," which was filed as a U.S. National Stage Filing under 35 U.S.C. § 371 on Mar. 29, 2011. U.S. patent application Ser. No. 12/997,080 is a U.S. National Stage Filing of International Patent Application Serial No. PCT/IB09/05562, filed May 11, 2009, which claims priority to U.S. Provisional Application No. 61/059,998, filed Jun. 9, 2008.

TECHNICAL FIELD

The present invention relates generally to communications networks, and in particular, to a system and method utilizing identifications (IDs) to release resources in a telecommunications network.

BACKGROUND

Third Generation Partnership Project (3GPP) is currently creating updated specifications for core network nodes, such as a Mobile Management Entity (MME), a Packet Data Network (PDN) Gateway (PGW), and a Serving Gateway (SGW). These nodes will eventually replace the existing Gateway General Packet Radio Service (GPRS) Support Nodes (GGSNs)/Serving GPRS Support Networks (SGSNs) used in earlier implementations of the 3GPP network for the Internet Protocol (IP) connections with mobile User Equipments (UEs).

When a UE in Long Term Evolution (LTE) powers up, an IP connectivity session (always on) is established with the core network. In system Architecture Evolution (SAE), this IP connectivity is currently known as a Packet Data Network (PDN) connection, an Evolved Packet System (EPS) session, or an Evolved Packet Core (EPC) session.

Although networks are progressing towards an "always on" IP connectivity with UEs, not every UE has always on IP connectivity. In contrast, in LTE networks, all UEs will have always on IP connectivity. Additionally, Circuit Switched (CS) services will not be provided on LTE accesses, except by simulation over IP. Thus, IP service is more critical and of higher volumes than in current implementations. When LTE is fully deployed, PDN connections in the network will increase dramatically, with each PDN connection being critical for providing an LTE mobile service.

Core network nodes are expected to have capacities of the order of a hundred thousand to a few million PDN connections. There are several implications to these vast numbers of PDN connections. First, when a single node fails or the IP network to/from that node fails, there are potentially hundreds of thousands of PDN connections impacted. Second, due to roaming, a PGW may have different PDN connections that are involved with dozens of other peer nodes in other operator networks at any time. In a large operator's network, any core network node may have PDN connections going through hundreds of other peer nodes, even in the same network. These types of issues exist in existing GGSN/SGSN networks, although of smaller scale and where IP services are of much less criticality. For example, when an SGSN fails in an operator's network, the failure can impact operation GGSN nodes and other nodes of all types for a substantial period of time.

To counteract this weakness, operators typically have IP network path redundancy to improve IP network resilience. Obviously, almost all vendors try to reduce the frequency of complete node failure by providing internal hardware redundancy within a node for the components most likely to fail (i.e. power supplies, external links etc). However, some vendor's component redundancy might only be for availability (i.e. new PDN connections) not retainability (i.e., keeping existing PDN connections). Even in fully redundant hardware networks with retainability, this does not protect against double hardware faults or software or operator configuration faults of some types (which are duplicated). If these teardowns are signaled individually, this represents a significant signaling rate required just to indicate the connections are to be torn down. Additionally, a reliable peer node is impacted by unreliable peers.

These issues exist to some degree in existing SGSN/GGSN networks. International Publication Number WO 2005/079100 discusses issues related to SGSN/GGSN resources that apply to PGW/SGW/MME resources, but now must cover a wider range of possible resources. However, there are also some other new issues that have surfaced. FIGS. 1A and 1B are signaling diagrams illustrating a power up (initial attach) procedure in LTE/SAE in an existing system. FIGS. 1 and 1B describe this attachment process as detailed in 3GPP TS 23.401. A UE 10 needs to register with the network to receive services that require registration. This registration is described as Network Attachment. The always-on IP connectivity for UE/users of the Evolved Packet System (EPS) is enabled by establishing a default EPS bearer during Network Attachment. The Physical Connection Circuitry (PCC) rules applied to the default EPS bearer may be predefined in a Packet Data Network Gateway (PDN GW) and activated in the attachment by the PDN GW 12 itself. The Attach procedure may trigger one or multiple Dedicated Bearer Establishment procedures to establish dedicated EPS bearer(s) for that UE. During the attach procedure, the UE may request an IP address allocation. During the Initial Attach procedure, the Mobile Equipment (ME) Identity is obtained from the UE. A Mobile Management Entity (MME) operator may check the ME Identity with an Equipment Identity Register (EIR) 14. At least in roaming situations, the MME should pass the ME Identity to a Home Subscriber Server (HSS), and, if a PDN GW outside of the Visited Public Land Mobile Network (VPLMN), should pass the ME Identity to the PDN GW. FIGS. 1A and 1B are signaling diagrams illustrating the message signaling between the UE 10, an eNode B 16, a new MME 18, an old MME/Serving GPRS Support Node (SGSN) 20, the EIR 14, a serving Gateway (GW) 22, the PDN GW 12, a Policy and Charging Rules Function (PCRF) 24, and a Home Subscriber Server (HSS) 26. Relevant to the present invention, the new MME 18 sends a Create Session Request message 50 to the serving GW 22. The serving GW 22 then sends the create default request message 52 to the PDN GW 12. The PCRF 24 then provides a PCRF interaction 54 to the PDN GW. The PDN GW sends a Create Session Response 56 to the serving GW. The serving GW then sends a Create Session Response 58 to the new MME 18.

FIG. 2 is a signaling diagram illustrating an attach procedure for LTE with all GPRS Tunneling Protocol (GTP). This diagram is simplified to core nodes creating the PDN connection. FIG. 2 assumes that GTPv2 (GPRS Tunneling Protocol version 2) is being used between the three depicted nodes of an MME-1 80, an SGW-1 82, and a PGW-1 84. The MME-1 sends a Create Session Request 90 to the SGW-1 82. The SGW-1 then sends a Create Session Request 92 to the PGW-1. The PGW-1 84, in turn, sends a Create Session Response 94 to the SGW-1. The SGW-1 sends a Create Session Response 96 to the MME-1.

Proxy Mobile IP (PMIP) may also be used between the PGW and the SGW. FIG. 3 is a signaling diagram illustrating an attach procedure for LTE with PMIP. The diagram is simplified to illustrate the core nodes creating the PDN connection. As depicted in FIG. 3, the nodes are an MME 100, an SGW 102, and a PGW 104. The MME sends a Create Session Request 110 to the SGW 102. The SGW then sends a Proxy Binding Update 112 to the PGW 104. The PGW responds by sending a Proxy Binding Accept 114 to the SGW. The SGW, in turn, sends a Create Session Response 116.

There are several important features related to FIGS. 2 and 3. Each stable PDN connection exists only on one PGW, one MME and one SGW at a time (during a handover there can be more than one MME or one SGW for a short period of time). The PDN connection on the PGW cannot be moved without tearing the existing PDN connection down. The MME has stored critical information not available elsewhere, such as the UE's current tracking area list. The MME is the only node that actually initiates a mobility procedure (i.e., moving a PDN connection to another SGW or MME).

The above features implies that if an MME fails, the PDN connection for the PDN connection on the other two peer nodes must be released since there is no chance for recovery. PGW failure produces the same type of situation. Thus, the PDN connections that need to be released in the other nodes must be signaled to the peer nodes or tied implicitly or explicitly to some other identifier.

It is well known in the industry that to deal with entire node failures, it is sufficient to have two basic functions. The first function is the local node stores the remote peer node identifications (IDs) involved when it creates its corresponding local internal resources and stores the peer nodes IDs with the internal resources or equivalent information, such a pointer to an interface/socket, etc. . . . . The second function is a echo/heartbeat message with restart counter between at least the node's nearest neighbors. Absence of a heartbeat message for a period of time indicates a neighbor node is assumed down or a communication fault to the neighbor node has occurred. Receiving a heartbeat with a restart counter that is higher than a previous restart counter also indicates the peer node restarted without detecting a missing heartbeat. When a nearest neighbor is detected as down/restarted, this information might be relayed down the line. Simultaneously, all internal resources associated with the neighbor are torn down.

It should be understood, that at least one bit of the restart counter of each node needs to be explicitly stored with the PDN connection data. This is needed to allow for a peer restart and new PDN connections to be setup while old PDN connections are being released simultaneously. Otherwise, all PDN connection releases must be performed before any new traffic is setup, which is usually undesirable since it extends the outage duration but is otherwise a valid implementation. The restart counter allows for the possibility that communication is lost for a period of time between nearest or non-nearest neighbors. For example, if an SGW fails, it is not known if a PGW restarts during the SGW failure. This is not always an unusual situation since a PGW and SGW function might be collocated.

Systems may reduce the payloads needed to transfer the information by including the information with existing messaging. FIG. 4 is a signaling diagram illustrating the basic information necessary to allow PDN connection when a node fails. The data indicated in each message is stored either explicitly or implicitly with the nodes PDN connection data record. In FIG. 4, three nodes are illustrated, an MME 120, an SGW 122 and a PGW 124. A Create Session Request 130 containing $MME_{id}$, MME_restart_count information is sent to the SGW. The SGW relays this information with $SGW_{id}$, and SGW_restart_count information in the Create Session Request 132 to the PGW 124. The PGW responds by sending a Create Session Response 134 having $PGW_{id}$ and PGW_restart_count information to the SGW 122. The SGW then sends a Create Session Response 136 having the $PGW_{id}$ and PGW_restart_count information with $SGW_{id}$ and SGW_restart_count information to the MME. The MME should be aware of which PGW node and SGW node is being used since the MME selects the PGW and SGW in the attach procedure. Thus, external signaling is not required. The MME should be aware of the SGW restart count from the heartbeats. The SGW should know the MME's identity and restart count based on the GTPv2 interface. The PGW is likely to be unaware of the MME's identity since it is communicated indirectly (especially in the PMIP case). Thus, the MME identity must be communicated explicitly. Explicit communication of each node's ID is generally preferred since some nodes are multi-homed.

FIG. 5 is a signaling diagram illustrating the minimal data needed in the messages. The actual data that needs to be logically stored and correlated internally in each node is the same as explained in FIG. 4. However, the message sizes are reduced. The basic heartbeat with node identity and restart count in the bearer setup is sufficient to deal with an entire node becoming unavailable.

A system and method are needed to allow a clean recovery for handling of faults corresponding to an entire node failure. If a major component of a node fails and most connections are still valid, it is not desirable to shut the full node down. This would result in tens or hundreds of thousands of PDN connections that would to be cleared. This places high loads on the nodes that have not failed simply to indicate a component failed.

There have been several proposals in 3GPP systems to deal with this issue. In some cases, an additional identifier is added. This identifier varies significantly dependent on the particular model of internal resources in each node. To fully understand this problem, hypothetical but realistic vendors' implementations shall be discussed below.

In a first vendor design, a PGW node is designed with many boards. Each board has one unique IP address. All boards serve any Access Point Name (APN). Load distribution for new connections depends on having a record for each board. This design is such that when a PDN connection is created, both the control plane and user plane function are on the same board. The board does not replicate PDN connection data between boards. Thus, if the board fails, the PDN connections on the board fail. Such a vendor might advocate that a system be developed based primarily on heartbeats. Specifically, if the heartbeat fails to a PGW control plane address, then the SGW should clean up all PDN connections for that PGW control plane IP address. The SGW then sends a "PGW partial failure message" to the MME, which cleans up PDN connections for that PGW control plane IP address. This gives a complete solution for cleanup of a PGW board failure for the first vendor design.

In a second vendor design, a PGW node is designed with a pair of control plane boards in an active warm standby mode. The control board serves any APN. PDN connection state data between the two control plane boards is not replicated. When a control plane board fails, all PDN connections are lost. There are also many user plane boards. Each user plane board has one unique IP address. The control plane board picks one user plane board to use for the PDN connection. The user plane boards also do not replicate. If that user plane board fails, the PDN connection has to be torn down and rebuilt. In this design, it would be advantageous to utilize heartbeats for both the user plane and the control plane. This would place a higher workload on the SGW and the MME. Thus, the resources in those nodes have to track both addresses.

In a third vendor design, a PGW node is designed with several control plane boards, each with a different IP address. The design uses device processor boards and user plane boards. The user plane boards only control specific device processor boards. If a user plane board fails, the device processor board must also be shut down. When a control plane board fails it brings down the PDN connections. In this design, as in the second vendor design, it would be advantageous if both user plane IP addresses and control plane IP addresses be tracked.

In a fourth vendor design, a PGW node is designed with a pair of control plane boards, each with a different IP address. Each control plane board is used in a fifty/fifty load sharing mode. The two boards serve any APN. PDN connection state data between the two control plane boards is constantly replicated. When a control plane board fails, both IP addresses are serviced by one board and no stable PDN connection data is lost. There are also many user plane boards. Each user plane board has one unique IP address. The control plane board picks one user plane board to use for the PDN connection. The user plane boards do not replicate. If that user plane board fails, the PDN connection has to be torn down and rebuilt. In this design, only a heartbeat based on the PGW user plane IP address is required.

In a fifth vendor design, full duplication of both control plane board and user plane data is implemented whereby a redistribution scheme is used to allow multiple failures if spread out in time. Only one external IP address to the core network side with multiple load shared interfaces is utilized. Thus, hardware faults in the node itself are not considered a problem. However, this vendor design concentrates on PGW for corporate APN and focuses on IP routing and outside support nodes (e.g., failure of a corporate server for a corporate APN). It is desirable in this design that an indication be provided for an APN that is down (e.g., the APN and the PGW IP address together as a key in a "partial failure message" to the SGW). In this design, the SGW clears all resources associated with the PGW IP address and APN combination. The SGW also indicates the same type of fault to the MME which clears the same data.

In a sixth vendor design, a similar type of high reliability as the fourth vendor design is used. But this vendor design focuses on internal software faults. This vendor design is not related to hardware failure.

Obviously, no single type of single identifier can meet the needs of the above vendor designs. Furthermore, even for one vendor design type, there may be design modifications over time. This would be an internal issue except the peer nodes are forced to try to implement a search for the particular identifier and are expected to store this information and be able to search for it. Supporting all the various vendor designs is not a reasonable approach and it does not even address all types of internal resources/components.

Currently, there is an identifier designated as a Forlopp identifier (ID) in a Switching System for Mobile and Fixed networks/Application Execution Environment (AXE) design. The AXE creates a separate ID called a "Forlopp ID" for tracking a related set of resources in a telecommunications call. This is also a trace ID. When a call is initiated, a new Forlopp ID is requested from the Axe Control System (APZ). The APZ loads this ID in a hardware register that is maintained across signals between blocks. All blocks that were visited by the Forlopp ID are also stored by a Forlopp manager in the APZ. If a fault occurs during call processing, a hardware register has the Forlopp ID and an interrupt is generated to trigger the Forlopp manager to start the error handling process. The previously stored information is used to generate a Forlopp error message to each block with the Forlopp ID. The block receives the error including the Forlopp ID and uses this in a small routine to clear any resources associated with the call with that Forlopp ID. This prevents memory leaks and hung resources while not disturbing other calls on the AXE. During execution, a process may be stopped and restarted as part of waiting for external signals.

To support this function, a Forlopp ID adapted software module stores the Forlopp ID with the call related data. When the call is restarted, the block restores the Forlopp ID before continuing execution. It would be advantageous to utilize this existing concept to solve the afore-mentioned problems. However, the Forlopp ID in the AXE is on a call ID (or command ID) basis identifying a single call. This existing system utilizes a straightforward one to one mapping. Although this could be implemented with PDN connections, it would not assist in reducing signaling at faults which is one of the key difference between AXE Forloop and the present invention.

Signaling reduction may be achieved with a trivial extension of AXE if only a single node was involved. The MME is the first step in the chain. The MME could generate a Forlopp ID as an integer or other ID. That Forlopp ID would be included in the Create Session Request and the receiving nodes could store that ID. The MME vendor would look at its hardware/software model and pick the Forlopp IDs so the MME's components that are likely to fail are in one to one correspondence to the Forlopp IDs generated. Here the Forloop ID is chosen by the MME. However, the existing proposals and mechanisms use IDs that are chosen to correspond to externally seen identifiers (e.g., IP addresses of an interface or APN).

The Forlopp ID is managed by a single centralized function in the AXE. This cannot be applied to solve the afore-mentioned problems due to scaling and latency issues. Additionally, there are still the problems associated with a multi-vendor environment. In addition, the AXE typically behaves, in most respects, as a single CPU processor and monitors itself. The AXE does not deal with lost signals and peers going down (only processes).

SUMMARY

The present invention streamlines the release of resources associated with PDN connections when a partial but major component of a node fails. The primary goal of the present invention is to reduce signaling between nodes, while maintaining high retainability for existing PDN connections. The present invention may be applied to any protocol between nodes even when there is no direct communication between nodes.

Thus, in one embodiment, the present invention is directed to a method of releasing resources in a telecommunications network for one node. The method begins by a node assigning a resource-Identification (ID) to an internal resource within the node. At least one internal resource is allocated by the node for a specific Packet Data Network (PDN) connection. Next, a first message containing a resource-ID(s) of the allocated internal resource(s) is sent to one or more nearest neighbor peer nodes involved in that PDN connection typically during PDN connection establishment but it can be later. The peer node(s) store the received resource-ID(s) from the first message. If the nearest neighbor peer nodes themselves interact with other peer nodes for the PDN connection the peer nodes can send the resource-ID(s) to those peers which in turn store the resource ID. This can continue farther into the network or stop at any point. This creates a chain of nodes all tied to the same PDN connection and same resource-ID. When that one node determines that a malfunction of the allocated internal resource of the node occurs, the node sends a second message containing the resource-ID of the malfunctioning internal resource to the peer nodes (at least the nearest neighbors). The peer nodes then tear down the PDN connection and send indication to any of their peer. The key advantage here is that for one internal resource impacting many PDN connections that fails only one message is sufficient to be sent to a nearest neighbor to allow the neighbor to tear down every PDN connection associated with the peers internal resource. The added small cost is memory storage in the peer for storing the resource ID(s).

In another embodiment, the present invention is directed to a system for releasing resources in a telecommunications network in more than one node. Here each node creates its own resource-IDs and every peer ideally stores every other peers resource-IDs and the resource IDs are unique between nodes (or a node ID is available from another source). When a failure occurs in any node the same mechanism as the single node failure case is used. This differs in a fundamentally way from the Forlopp ID concept in the AXE where a call generally only had one Forlopp ID. Here we have multiple resource-IDs for each PDN connection possible since many components in different nodes can impact that PDN connection. The impact is again memory and allows teardown for any component that fails that has a resource ID.

The system includes a node communicating in the telecommunications network with a first peer node. The node assigns a resource-ID to an internal resource within the node. In addition, the node allocates at least one internal resource by the node for a specific PDN connection. The node sends a first message containing a resource-ID of the allocated internal resource to the first peer node. The first peer node then stores the received resource-ID of the first message in the first peer node. When the node detects a malfunction of the allocated internal resource of the node, the node sends a second message containing the resource-ID of the malfunctioning internal resource to the first peer node. The first node then tears down the PDN connection associated with the resource-ID.

In still another embodiment, the present invention is directed to a node for releasing resources in a telecommunications network. The node communicates with a first peer node in the telecommunications network. The node assigns a resource-ID to an internal resource within the node. In addition, the node allocates at least one internal resource for a specific PDN connection. The node sends a first message containing a resource-ID of the allocated internal resource to the first peer node. The node determines when a malfunction of the allocated internal resource of the node occurs and sends a second message containing the resource-ID of the malfunctioning internal resource to the first peer node.

DETAILED DESCRIPTION

Figure 6:
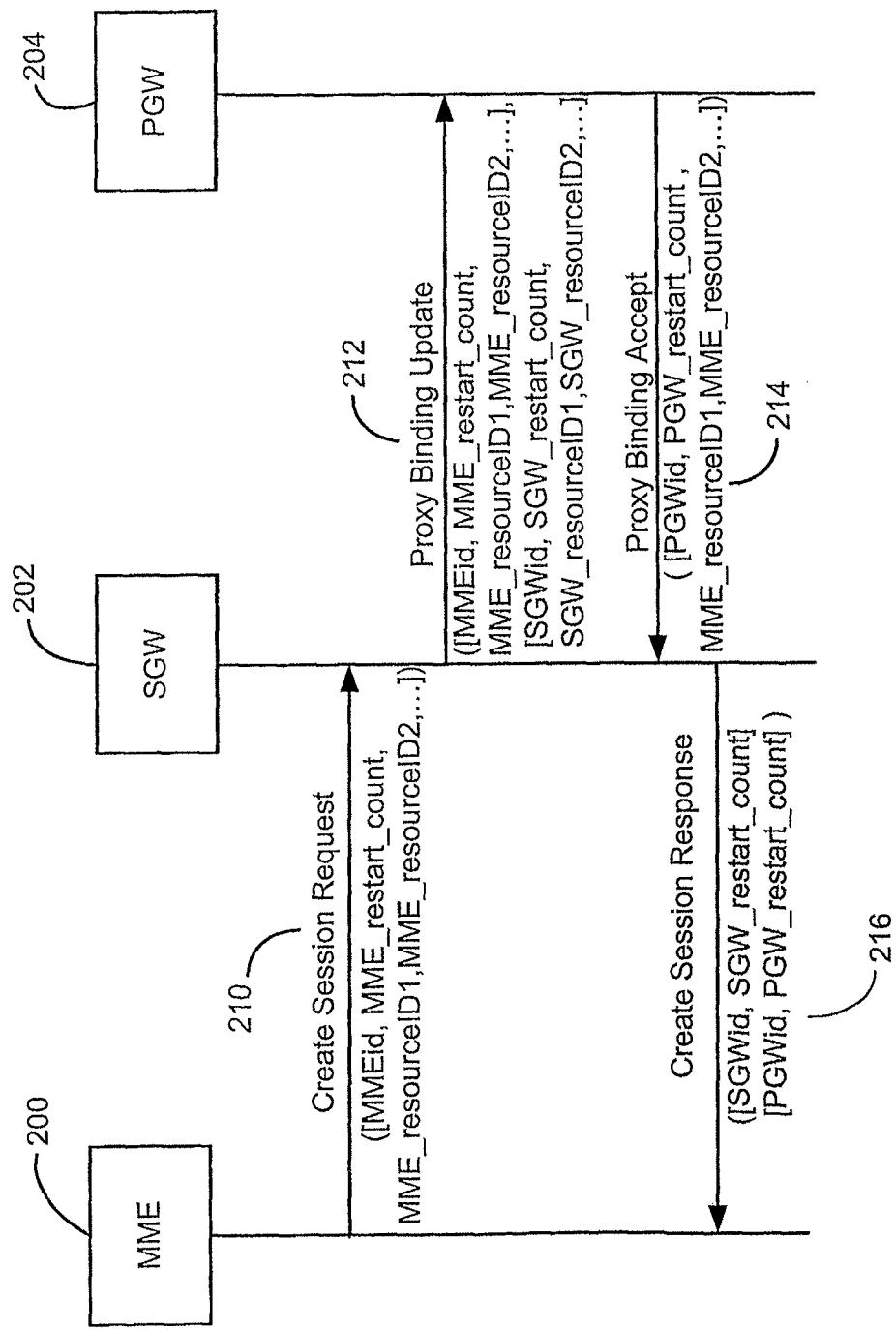
FIG. 6 is a signaling diagram illustrating the information flow necessary to allow subsequent PDN connection clearing when a component of a node fails.

The present invention is a system and method of releasing resources in a telecommunications network. FIG. 6 is a signaling diagram illustrating the information flow necessary to allow subsequent PDN connection clearing when a component of a node fails. The data indicated in each message is stored either explicitly or implicitly with the nodes PDN connection data record. In FIG. 6, three nodes are illustrated, an MME 200, an SGW 202 and a PGW 204. However, it should be understood that the number and types of nodes are simplified to describe the present invention and that the type and number of nodes may vary from those discussed herein and still remain in the scope of the present invention. A Create Session Request 210 containing ([$MME_{id}$, MME_restart_count, MME_resourceID1, MME_resourceID2, . . . ]) information is sent to the SGW 202 by the MME 200. The SGW relays this information with [$SGW_{id}$, SGW_restart_count, SGW_resourceID1, SGW_resourceID2 . . . ] information in a Create Session Request 212 to the PGW 204. The PGW responds by sending a Create Session Response 214 having ([PGWid, PGW_restart_count, PGW_resourceID1, PGW_resourceID2, . . . ] to the SGW 202. The SGW then sends a Create Session Response 216 having the $PGW_{id}$ and PGW_restart_count information with $SGW_{id}$ and SGW_restart_count information to the MME.

Each node, MME 200, SGW 202, and PGW 204 preferably stores the resource-ID received in the incoming signals in the PDN connection record. Normally, a lookup entry is created for each node ID and resource ID as a key and the values are pointer to the PDN connection for that node ID and resource ID. This allows rapid searches in case of failure though storing the resource ID and node ID with the PDN connection data and a brute force search is allowed since it only occurs when a peer node fails. Each of the nodes also have a complete knowledge of the dependency of the resources, while still having no actual detailed knowledge of the internal structure of their peer nodes. If only one component fails in the node, the node itself would send a message out with the resource-id that failed. Preferably a new GTPv2 message type would be utilized, such as a Delete PDN Connection Set Request.

Figure 7:
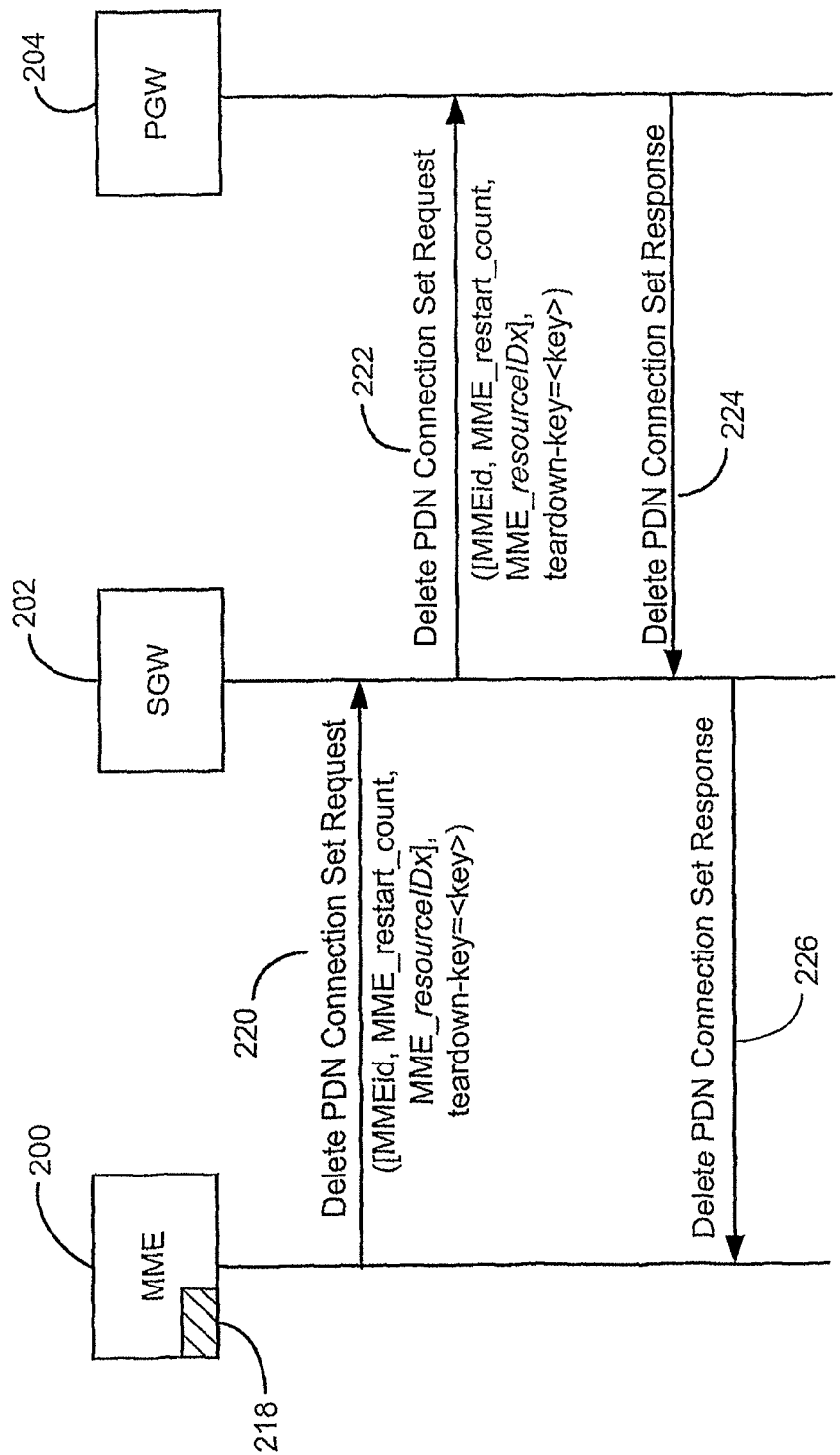
FIG. 7 is a signaling diagram illustrating the messaging when a resource fault is detected by the owning node.

FIG. 7 is a signaling diagram illustrating the messaging when a resource fault is detected by the owning node. In the present invention, each node sends a Delete PDN Connection Set Request to all neighboring peers. A response is preferably made as soon as a message is received. If a node has never sent a resource-ID to a peer node before, the node preferably does not send the Tear down Resource-ID.

The MME 200, in this case, having a fault 218, sends a Delete PDN Connection Set Request 220 to the SGW 202 with MMEid, MME_restart_count, MME_resourceIDx], teardown-key=<key>) information. Next, a Delete PDN Connection Set Request 222 with MMEid, MME_restart_count, MME_resourceIDx], teardown-key=<key>) information is sent from the SGW to the PGW 204. Next, a Tear Down Resource-ID Response 224 is sent from the PGW 204 to the SGW 202. A Tear Down Resource-ID Response 226 is then sent from the SGW to the MME.

The teardown-key above is used to act as a firebreak to ensure a node only acts once on a tear down, multiple actions will work but create wasteful load. A node receiving a Delete PDN Connection Set Request stores the teardown-key. If another Delete PDN Connection Set Request is received with the same teardown-key and same node-ID in the teardown-message ID for a short period of time after first receipt, the node does not send out a new Delete PDN Connection Set Request. This stops the message at the first routing loop. <key> preferably is a random number and does not change as it goes across the network (or in a retransmission from the initiating node). To reduce the crossing of two messages simultaneously due to differing signalling paths, the Delete PDN Connection Set Request messages may be delayed by a small random time period prior to transmission.

In another embodiment, such as if a new dedicated GTPv2 message is not possible, an Information Element (IE) may be added to a GTPv2 Echo Request to carry the resource-ID at failure. The resource-ID may also be piggybacked on any other GTPv2 message between the peer nodes to update the resource-ID when a resource changes or to indicate a fault. Piggybacking is to keep the signalling load as small as possible for the feature.

If an entire node fails, such as when a lack of a heartbeat is determined or by detecting that the restart count has changed, then tear down of all records based on that node ID may occur. The node detecting the fault then sends a Delete PDN Connection Set Request out to its peer nodes indicating the node was down in the same manner as discussed above, preferably with a flag indicating only the node ID needs to match or less efficiently with an explicit list of all resource-IDs for the node.

The different types of resources to be tracked for failures should be determined to implement the present invention. Preferably, a major component that can fail and impact any existing PDN connections is considered relevant and one that does not change except as triggered by a procedure. For example, an Ethernet card, a hard drive, a payload card, a CPU card, a digital processor, an IP route, a UNIX process in a process pool, and a shared memory pool are all components which may be tracked. However, small internal resources impacting only a few PDN connections are probably better handled by simply tearing down the PDN connections individually and are not good candidates for inclusion. Components that are duplicated in such a way that PDN connections are preserved (i.e. PDN connection data is replicated) are probably not tracked unless a double fault failure is to be handled. In the preferred embodiment of the present invention, the choice of type of resource to be tracked is made by a vendor. It is essentially private internal information.

In addition, the actual resource ID also needs to be assigned. The node owning the internal resource makes the resource-ID assignment. Each resource needs to have a distinct resource-ID number. For hardware resources, in most cases this is a task that may be conducted using a static assignment (e.g., board number plus the number of boards in a subrack*slot number+fixed offset). For software resources similar to a UNIX process, a simple incremental counter may be used. The only logical requirement is that distinct resources have distinct numbers. The node-ID and the resource-ID together make a fully distinct resource ID in the preferred embodiment. However, a resource ID with a pseudo-random component could be used with sufficient number of bits in a resource ID since it could be sufficiently unique to avoid accidental collision between nodes in most cases. It is also possible to employ a "fake" node-ID that represents a node-ID plus resource-ID. The encoding of the information as separate fields is desirable in certain functions (i.e. node restart) but is not essential to the core function of clearing a partial fault. Also, it is possible that a node have multiple node-ID that are aliases (for example IP addresses could be used as alias for a node). So long as either one is chosen as a canonical ID or all are signaled at fault then this is sufficient to map to the PDN connections. A unique node-ID per node is the preferred embodiment.

Figure 8:
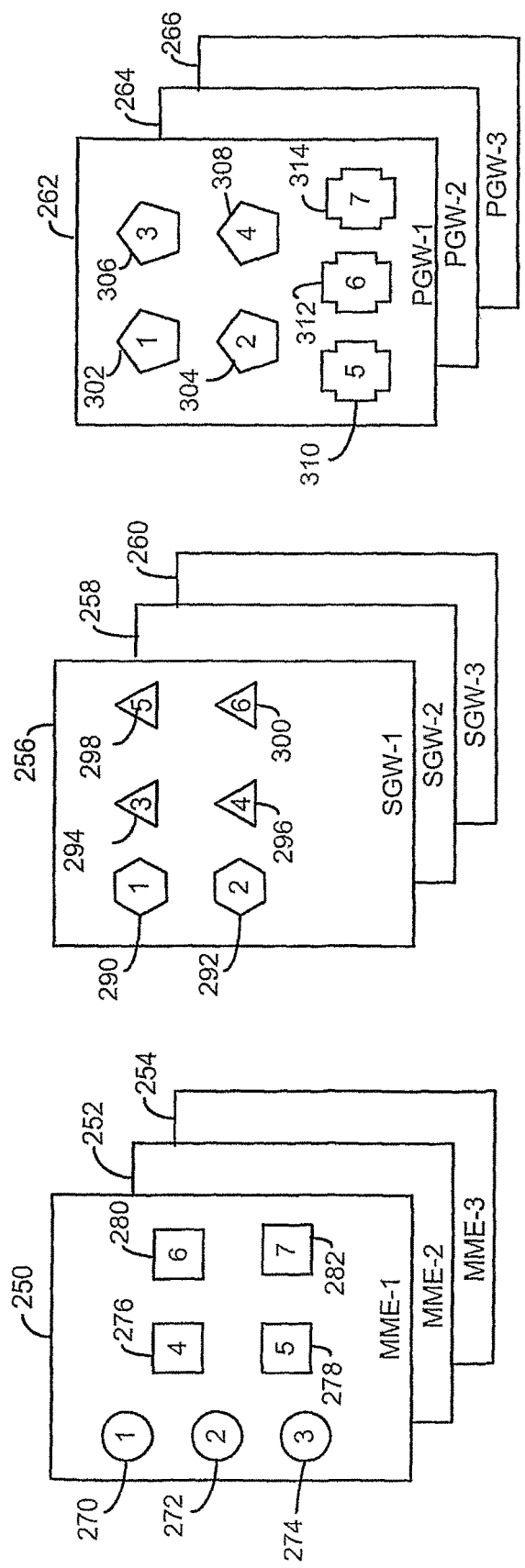
FIG. 8 is a simplified block diagram illustrating resources utilized with resource IDs.

The actual resource-ID value is sent in the messaging. However, what resource it represents internally to a node is not known based on the external signaling defined. Thus, the resource-ID is an opaque identifier to any peers. This opaqueness provides a strong advantage. Vendor hardware and software designs are completely decoupled while the internal resources impacting a PDN connection are linked as necessary. The linked internal resources are identified by the assigned resource-ID. The cost during normal traffic handling is a slightly larger message (i.e., several bytes to a few dozen bytes extra) and storage space for the IDs in the PDN connection records (and reverse lookup records if employed). FIG. 8 is a simplified block diagram illustrating resources utilized with resource IDs in one embodiment of the present invention. As depicted, there are a plurality of MMEs 250, 252, and 254, a plurality of SGWs 256, 258, and 260 and a plurality of PGWs 262, 264, and 266. Within each node is a plurality of internal resources. The various shapes depict different types of internal resources while the numbers within the shape indicate resource ID numbers. The number and type of nodes and internal resources are exemplary only. Nodes and types of resources may vary and still remain in the scope of the present invention. As depicted in FIG. 8, the MME 250 includes internal resources 270, 272, 274, 276, 278, 280, and 282. The SGW 256 includes internal resources 290, 292, 294, 296, 298, and 300. The PGW 262 includes internal resources 302, 304, 306, 308, 310, 312, and 314.

Although FIG. 8 depicts each node having only two types of internal resources, a node may have only one type or more than two types of internal resources. Not all types of resources have to be involved in all PDN connections. The same resource type may have more than one resource of the same type in the same PDN connection. In general, there are no restrictions on what internal resource is utilized, beyond the obvious practical limits of memory, signaling message size, etc.

There is also an implicit restriction in that the intended goal is to reduce signaling. Having the only resource type on the PDN connection level or user level would defeat the purpose of the present invention. Such a fine grained resource-ID could be included in addition to other resource-IDs that are coarser. Fine grained resource-IDs may be used for the purposes of debugging, troubleshooting, tracing or possibly even normal PDN connection termination.

Figure 9:
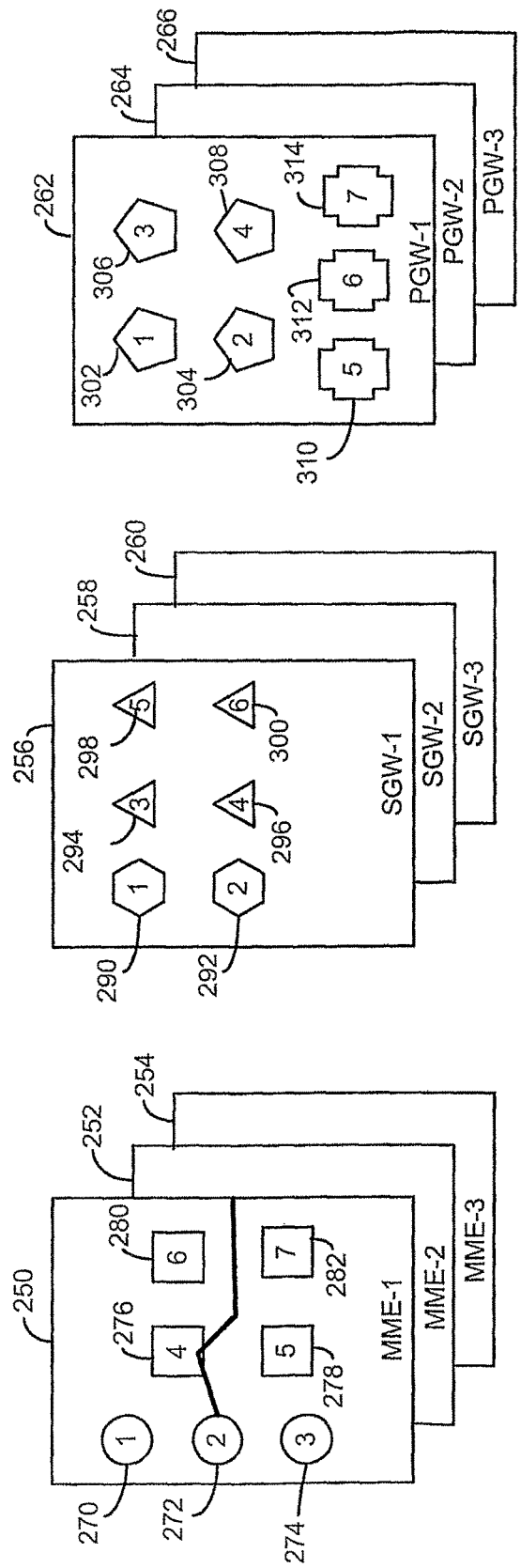
FIG. 9 is a simplified block diagram illustrating allocation of internal resources within the MME.

When a PDN connection is first created, the first node, the MME 250 in FIG. 8, decides which internal resources are needed and allocates these resources. The MME finds the corresponding resource-ID values for each of these allocated internal resources. FIG. 9 is a simplified block diagram illustrating allocation of internal resources within the MME 250. Typically, the MME does not require that separate data be added to the PDN record for its own MME resource-IDs. In general, a node does not need to store its own resource-IDs though it may be convenient. The internal resources are not used for external use in the main use cases. The node does have to clean up its own internal resources on its own component failure and can mimic the external interface internally if necessary or desirable. The node only needs to reliably remove PDN connections associated with one resource-ID while leaving the other resources operational. As depicted in FIG. 9, the MME 250 utilizes internal resource 272 ("2") and internal resource 276 ("4").

In a situation where a node does need to store its own resource-ID and restart a counter to mimic an external interface internally, the task is much easier than in an external scenario. The vendor picks the type of resource to match impacts on PDN connections. Thus, the PDN record typically will have existing pointers or indexes into the internal resources for the PDN functions to work. Logically the resource-ID goes with the resource and not the PDN connection. Thus, any existing internal records are normally sufficient. Reverse lookup, in most situations, is also available. Preferably, the restart counter is normally stored with the PDN connection.

Figure 10:
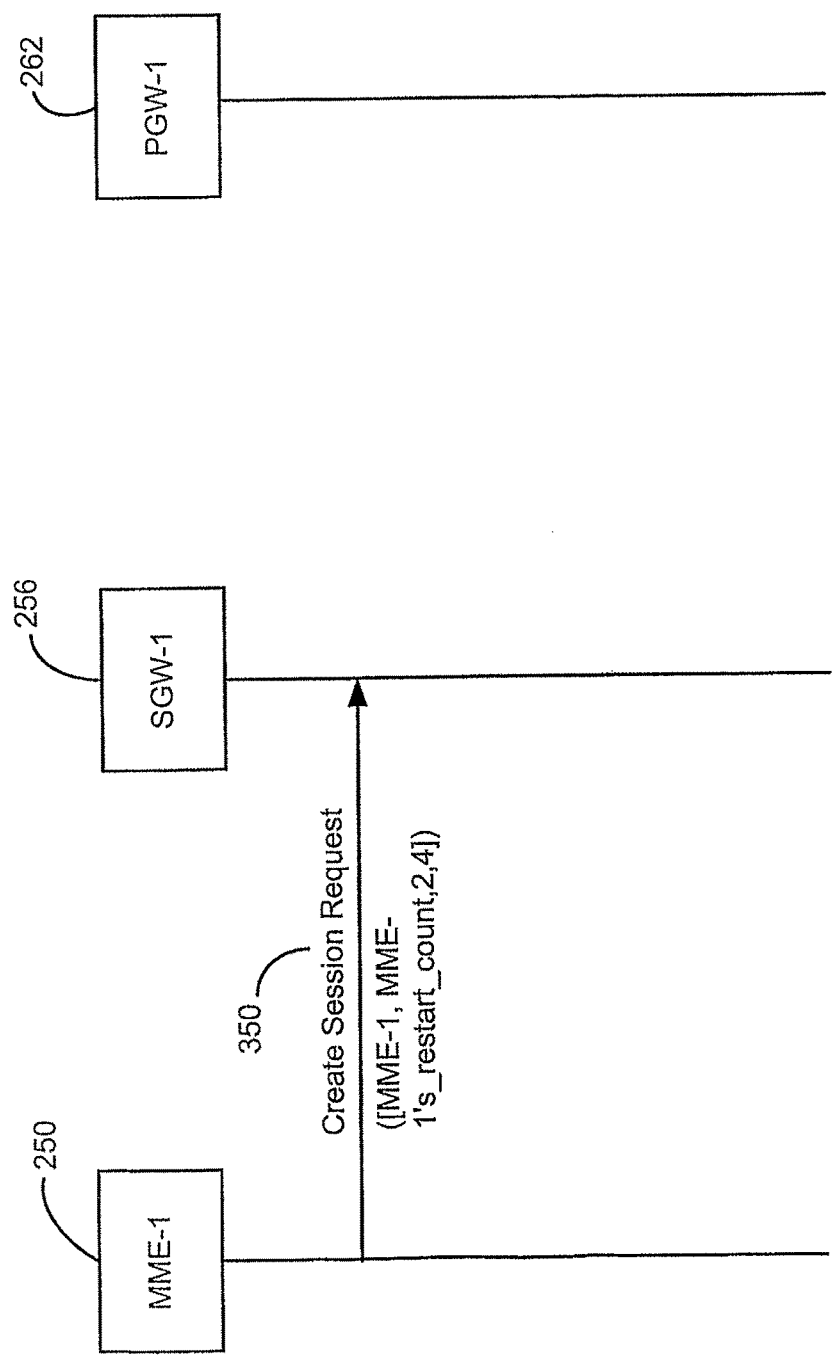
FIG. 10 is a signaling diagram illustrating sending internal resource ID numbers from the MME to the SGW.

Each node will include the internal resource number(s) in a message to its peer node. FIG. 10 is a signaling diagram illustrating sending internal resource ID numbers from the MME 250 to the SGW 256. The MME 250 sends a Create Session Request 350 to the SGW-1. The Create Session Request 350 includes MME-1, MME-1's_restart_count,2,4 information for the SGW 256. When the SGW 256 receives the Create Session Request 350, the SGW takes each of the fully qualified resource-IDs received within the message and stores resource-IDs in a newly created PDN connection record. In the preferred embodiment of the present invention, a reverse lookup entry is created from each resource-id to the PDN connection record to allow rapid lookup of the actual PDN connections impacted by a particular peer resource failing though a brute force search is viable.

Figure 11:
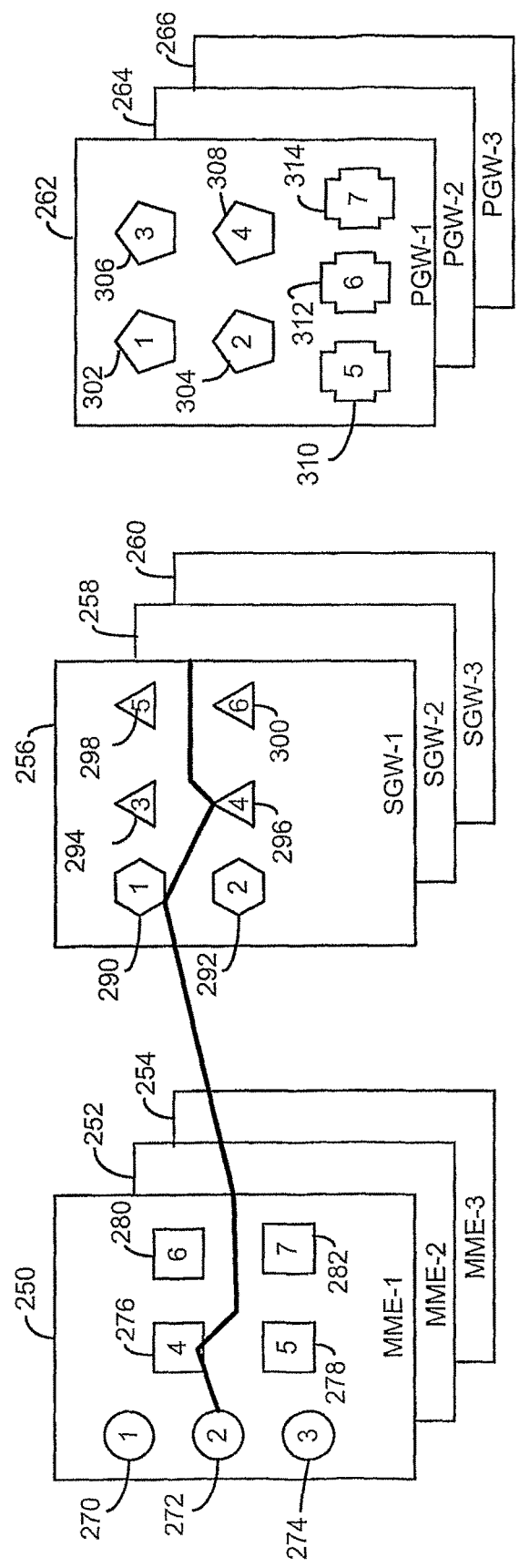
FIG. 11 is a simplified block diagram illustrating allocation of internal resources within the SGW.

FIG. 11 is a simplified block diagram illustrating allocation of internal resources within the SGW 256. As depicted in FIG. 11, the SGW 256 utilizes internal resource 290 ("1") and internal resource 296 ("4"). The SGW 256 performs the same internal actions as the MME performed. The SGW allocates specified internal resources and finds the resource-IDs for those resources (e.g., "1" and "4" in FIG. 11). The choice of resources and resource numbers may be totally different to allow the SGW vendor to choose what matches the reliability model for their implementation.

Figure 12:
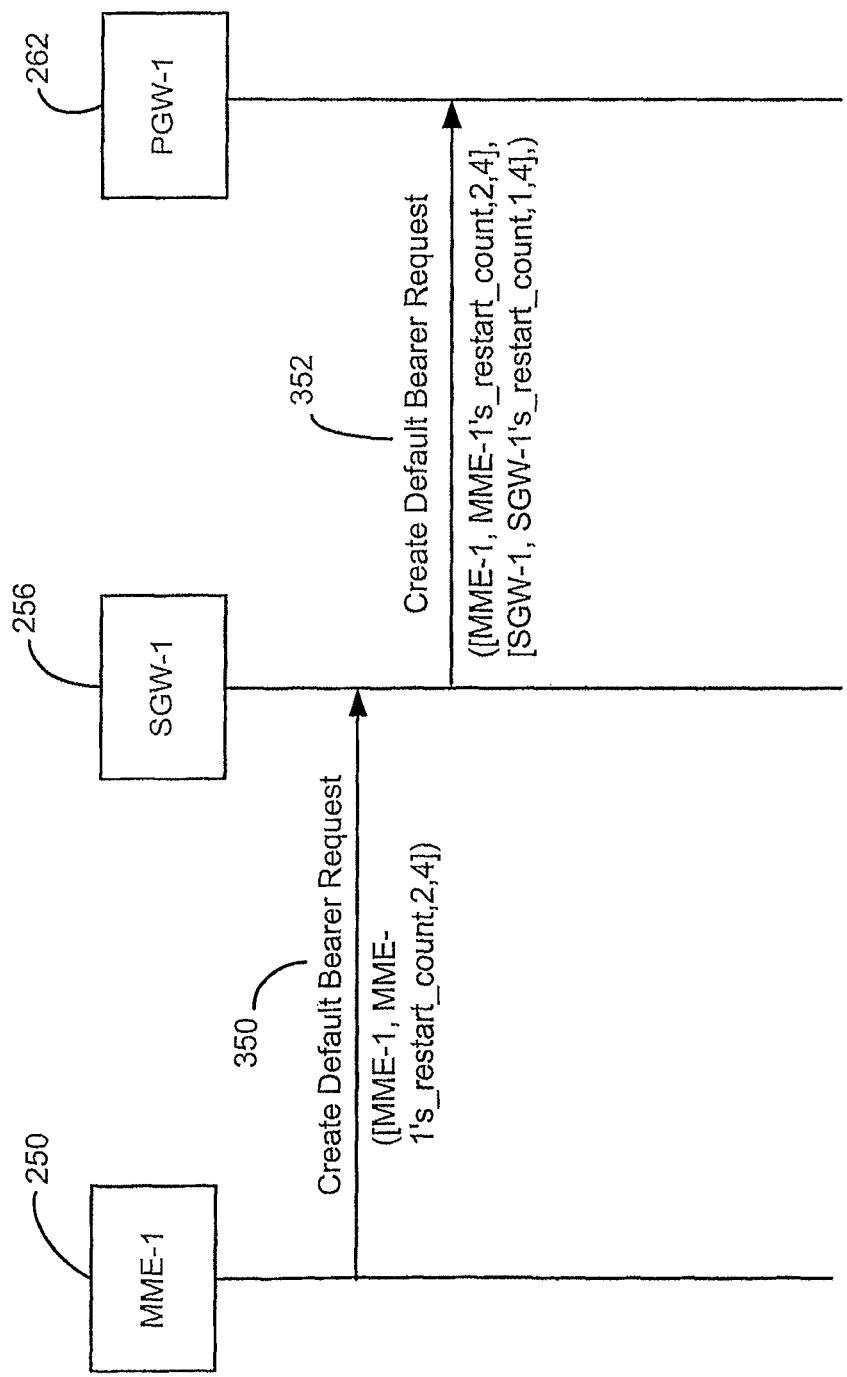
FIG. 12 is a signaling diagram illustrating sending internal resource ID numbers from the SGW to the PGW.

FIG. 12 is a signaling diagram illustrating sending internal resource ID numbers from the SGW 256 to the PGW 262. The SGW sends a Create Session Request 352 to the PGW-1. The Create Session Request 352 includes MME-1, MME-1's_restart_count,2,4, SGW-1, SGW-1's_restart_count,1,4 information for the PGW 262. The SGW includes the internal resource number(s) in the message to its peer node as well as any other resource-IDs it has received (e.g., information from the MME). When the PGW receives such a Create Session Request, the PGW takes each of the fully qualified resource-IDs received and stores the IDs in a newly created PDN connection record. In the preferred embodiment of the present invention, a reverse lookup entry is created from each resource-ID to the PDN connection record to allow rapid lookup of the actual PDN connections impacted by a particular peer resource failing.

Figure 13:
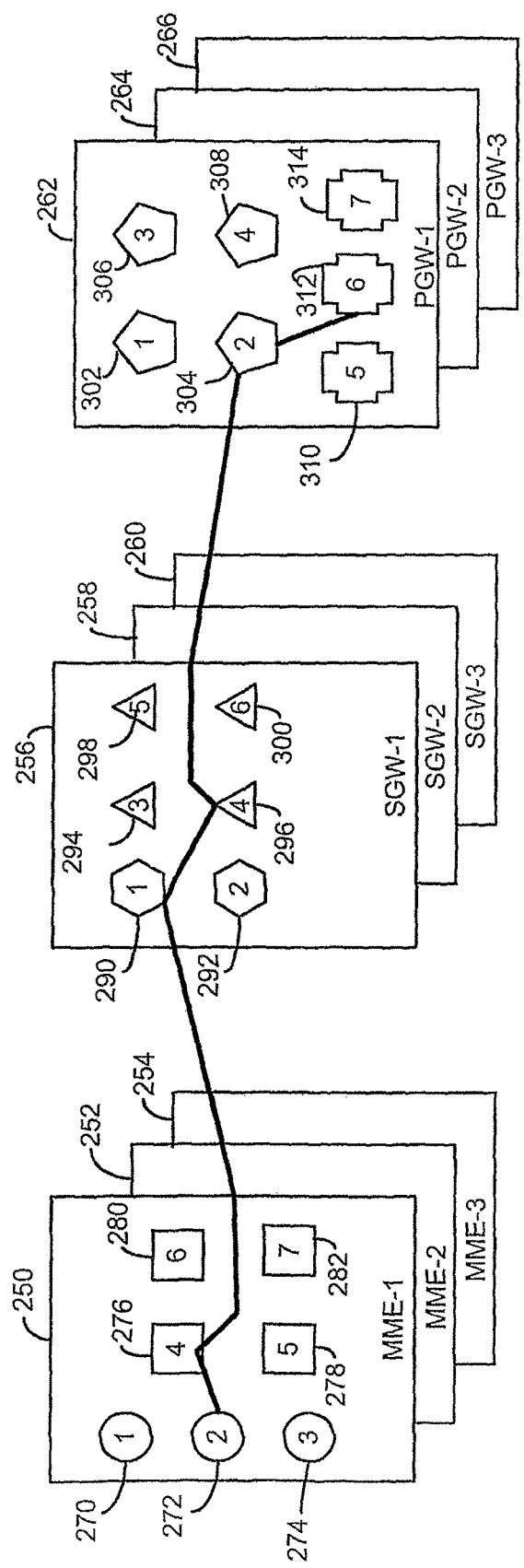
FIG. 13 is a simplified block diagram illustrating allocation of internal resources within the SGW.

FIG. 13 is a simplified block diagram illustrating allocation of internal resources within the SGW 256. As depicted in FIG. 13, the PGW 262 utilizes internal resource 304 ("2") and internal resource 312 ("6"). The PGW performs the same internal actions as the MME and SGW during their internal allocation steps. The PGW allocates any internal resources and finds the resource-ID's of those resources (e.g., "2" and "6"). The choices of resources and resource numbers though are potentially totally different to allow the PGW vendor to choose what matches the reliability model for their implementation.

Figure 14:
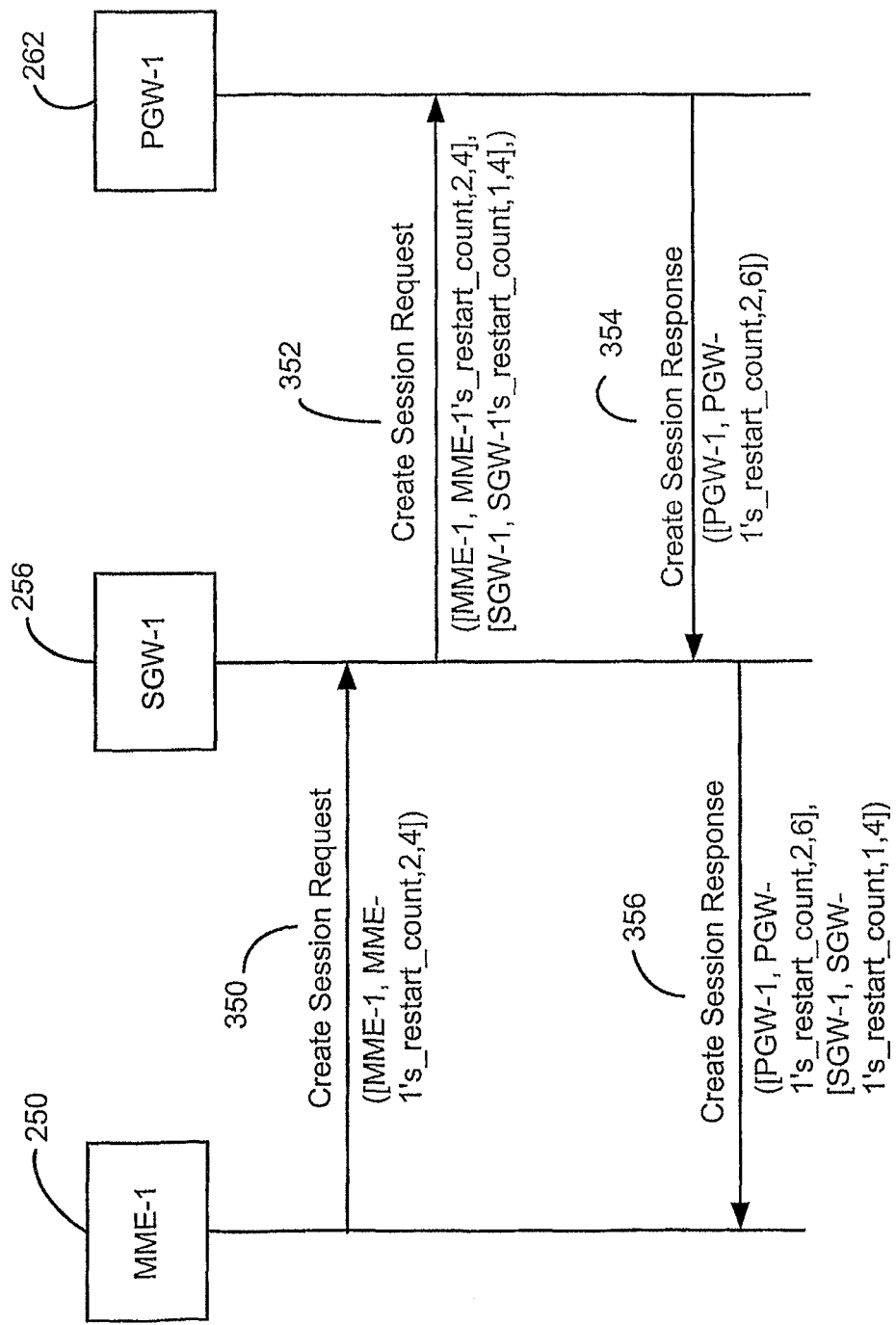
FIG. 14 is a signaling diagram illustrating messages sent to the SGW and MME by the PGW.

FIG. 14 is a signaling diagram illustrating messages sent to the SGW and MME by the PGW. The PGW sends a Create Session Response 354 to the SGW. Within the Create Session Response 354 is ([PGW-1, PGW-1's_restart_count, 2,6] information. The SGW sends a Create Session Response 356 to the MME having [PGW-1, PGW-1's_restart_count,2,6], [SGW-1, SGW-1's_restart_count, 1,4] information.

The PGW includes all the internal resource number(s) in the response message to its peer node, the SGW (e.g., information on the MME-1, SGW-1 and PGW-1) but excludes that information the PGW has received directly from the peer node (e.g., the PGW removes MME-1 and SGW-1 information so only PGW-1 is sent). When the SGW 256 receives the response message, the SGW takes each of the fully qualified resource-IDs received and stores the IDs in the newly created PDN connection record. In the preferred embodiment of the present invention, a reverse lookup entry is created from each resource-ID to the PDN connection record to allow rapid lookup of the actual PDN connections impacted by a particular peer resource failing.

The SGW 256 includes all the internal resource number(s) in the message to its peer node, the MME-1 (e.g., information of the MME-1, SGW-1 and PGW-1) but excluding that information which has been received directly from the peer node.

The MME 250 then takes each of the fully qualified resource-IDs received and stores the IDs in a newly created PDN connection record. Preferably, a reverse lookup entry is created from each resource-ID to the PDN connection record to allow rapid lookup of the actual PDN connections impacted by a particular peer resource failing.

Figure 15A:
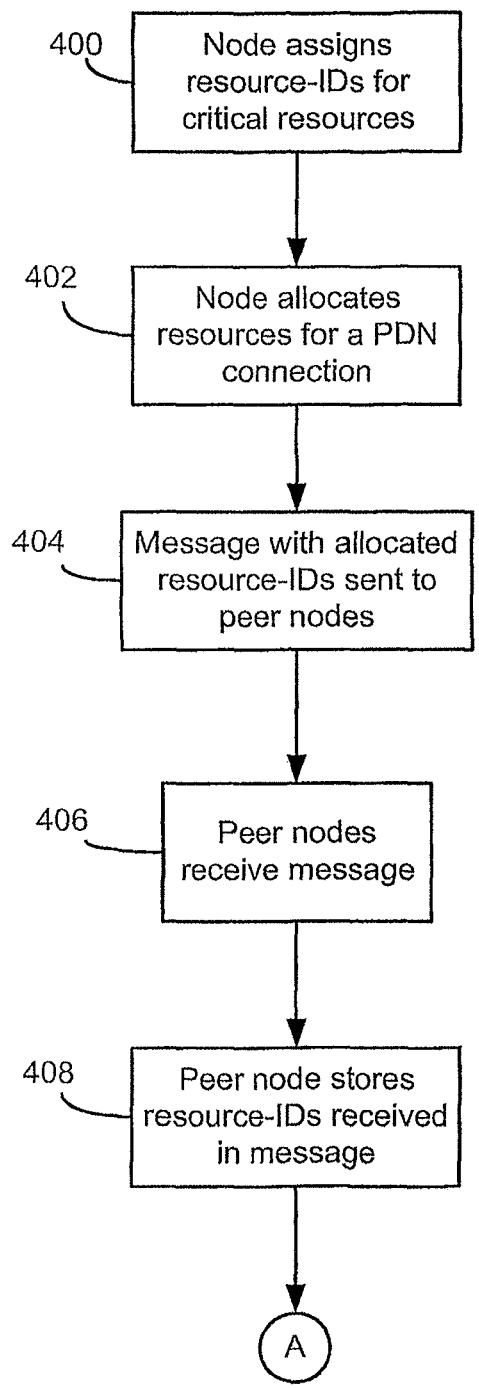
FIGS. 15A and 15B are flow charts illustrating the steps of releasing resources in a telecommunications network according to the teachings of the present invention.
Figure 15B:
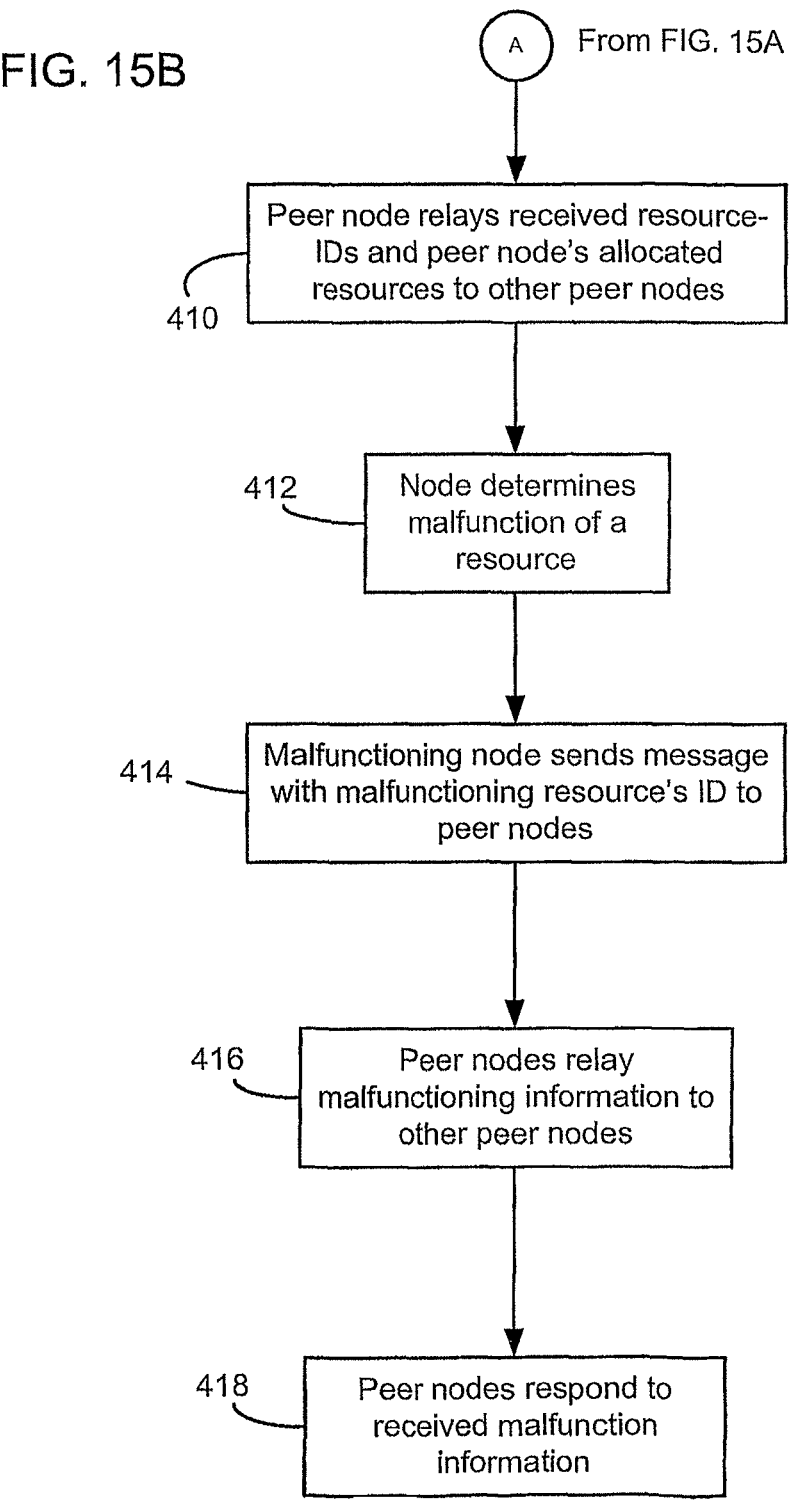

FIGS. 15A and 15B are flow charts illustrating the steps of releasing resources in a telecommunications network according to the teachings of the present invention. With reference to FIGS. 6-15, the method will now be explained. In step 400, each node (e.g., MME, SGW, and PGW) assigns a resource-ID to each of its critical components. The vendor may determine which components should be included in the assignment of resource-IDs. Preferably, the resource-ID is an opaque identifier to other peer nodes. Next, in step 402, each node allocates internal resources of the node for each PDN connection. In step 404, the node then sends a message providing the allocated resources' resource-IDs to neighboring peer nodes. Next, in step 406, the peer nodes receive the incoming messages. In step 408, each peer node stores the resource-IDs in a PDN connection record. Normally, a lookup entry is created for each node ID and resource-ID as a key. The values are then used as pointers to the PDN connection for that node ID and resource-ID. Next, in step 410, the peer node sends the received resource-IDs and the peer node's own allocated resource's resource-IDs to other peer nodes associated with the PDN connection. Likewise, the other peer nodes store this information. Thus, all nodes associated with the PDN connection know the dependency for the PDN connection.

In step 412, a node determines a malfunction or failure in the node. Specifically, the node determines if a critical component which was assigned a resource-ID has failed. Next, in step 414, the malfunctioning node of step 412 sends a message with the resource-ID of the failed or malfunctioning component to the peer nodes. In one embodiment, the malfunctioning node sends a Delete PDN Connection Set Request message to the peer nodes associated with the PDN connection. In step 416, each peer node relays the message of step 410 to its neighboring peer nodes associated with the PDN connection. In step 418, each peer node responds to the Delete PDN Connection Set Request message by sending a response message to the neighbor peer nodes and tearing down the connection of the associated PDN connection.

Traditional heartbeat or echo request-type mechanisms for inactive nodes may be used for fault detection. A lack of traffic (including heartbeat signals) indicates a node is likely suffering a malfunction and starting to remove resources associated with it.

For active nodes, the nodes restart count is included in each PDN creation message at least when it is the first communication between peers since the last restart Thus, neighbor nodes may detect that a node has restarted. Waiting until an Echo/Heartbeat is possible but simply delays the recovery process. However, since the MME and the PGW do not directly communicate, the restart counts cannot come from the link and heartbeat. For a component fault, the node preferably detects its own component faults that do not result in complete node failure.

When a fatal fault occurs in one component in a node that was previously reported in a fault message, the node preferably sends a "partial fault message" with the impacted resource-ID(s) to at least its immediate nearest neighbors in the chain (a directed graph in general). Only one message is required to denote all PDN connections for an entire component. Each neighbor node then finds all PDN connections with the impacted resource-ID(s). The node accomplishes this by utilizing the reverse lookup tables keyed by the ID when it created the PDN connection if available or a brute force search if not. The node then clears all PDN related resources with the relevant resource-ID(s).

The node having a component that actually fails does not require any record about what PDN connections failed on that component for external signaling to other nodes. However, the node may have such records for clearing resources on other internal component (i.e., same techniques may be used internal to a node as externally used). The association is typically indirectly made so only the resource-ID of the failed component needs to be signaled.

In one embodiment, the SGW and PGW may also communicate using PMIPv6. With this protocol, the nodes are called Media Access Gateways (MAGs) and Local Mobility Anchors (LMA). For PMIPv6, the resource-ID may be carrier in a vendor specific Mobility option in Proxy Binding Update and Proxy Binding Accept messages during PDN creation. The resource-ID is then stored in the binding table (e.g., the PMIPv6 name for the PDN connection table). The scheme is similar to GTP in all other details. Any of the PMIPv6 messages may be used for initiating the release. However, a dedicated message may be used, but would require Internet Engineering Task Force (IETF) involvement, however the Bulk Revocation Indication (BRI) message is well suited to the task (Binding Revocation for IPv6 Mobility-draft-ietf-mext-binding-revocation-05.txt) if it is approved.

If a MAG needs to send a release, it can be indicated as a vendor option in the Binding Update to the LMA (e.g., piggybacked on a message or a Proxy Binding Update for a non-existent user and a binding time of 0). The BRI message is preferred however assuming it is standardized in IETF or 3GPP In another embodiment, nodes may communicate with both GTP and PMIP links. In this embodiment, the GTP may be used to indicate the fault.

In some cases, an internal resource may no longer be used in a PDN connection. The most likely scenario for this requirement is when a bearer is added or removed in a PDN connection. The resource-ID may be piggybacked with the PDN update/modify bearer request/response with a list of resource-IDs to remove from the PDN record or the new full list can be sent with a rule to always overwrite.

At handovers, the SGW or MME may change. In this scenario, the handling should be a simple substitution. For a SGW change, the new SGW ID, restart count and resource-ID replaces the old SGW resource IDs in the records in the PGW and MME. This substitution does not need to be signaled so long as the peers are aware a node changed or the new resource_IDs are sent shortly. Alternately, resource-ID unlink and addition commands may be used (i.e., a list of resource-ID to add and a list to remove in the messages or new full list can be sent with a rule to always overwrite). Additionally, at MME change the PGW and SGW would perform the same type of actions.

The restart count is needed or at least desirable because it takes a finite period of time to clear a large number of connections. The present invention reduces the number of external signals between the PGW, SGW and MME, but there is potentially signaling required towards other nodes. There are also tasks which need to be conducted internally. If the number of PDN connections needing to be cleared is in the hundreds of thousands or more, there is a high probability that the node that restarted will be ready for new traffic (especially if it has warm standby hardware). While a peer node is clearing, the old data may be able to handle new connection requests. It is possible to implement a simple dirty bit (e.g., when a peer is seen to restart all records corresponding to that peer are marked with Boolean as needing to be cleaned out). In this case, new traffic coming in does not set the Boolean. However, that is equivalent to a 1 bit restart counter implementation. Using at least 2 bits is needed/desirable in case a node cyclically restarts before making contact to its peers. This allows the "oldest" records to be purged first. If the restart count is in the heartbeats and heartbeats are sent often enough, there is no need to have restart count in the message.

In another embodiment of the present invention, the resource may provide the restart count (ideally as an associated field but may be encoded in the resource-ID bits). When a resource is reported down, if the same resource returns, it is essentially a restart of that resource-ID. Using a resource-ID with its own restart count is supported by a trivial change in the messaging structure presented above. Instead of: (nodeID, restart count, resource ID1, resource ID2 . . . ), the present invention may utilize the structure: (nodeID, {restart count of resource ID1, resource ID1}, {restart count of resource ID2, resource ID2, . . . ). However, this provision may also be directly supported as is described above. Thus, a vendor may change resource-ID values when a resource fails and not reuse that resource-ID number for a period of time. In such a case, the resource-ID itself may include the "version" of the resource-ID, which may be included in an indicator within the resource-ID by the addition of a few more bits.

The present invention may be implemented in other nodes. Although a description of the MME, SGW, and the PGW is provided, it should be understood that the present invention may be utilized with other nodes, such as the eNodeB. For example, the eNodeB may be included by simply relaying the same information as above in the eNodeB to MME S1 control plane messages. The implementation may be done indirectly without S1 interface changes. For example, the MME may define each eNodeB it is connected as a resource-ID in the MME. The MME node monitors the eNodeB's health using conventional S1 link. If the eNodeB encounters a fault and goes down, this fault may be reported. This may be vendor specific and need not be specified since the resource-IDs are opaque. Furthermore, the SGW may also utilize this approach in the same fashion for S1-U. However, if the goal is to minimize signals to the PGW that resource ID attached to the eNodeB might be best only be exchanged between the MME and SGW and not to be sent to the PGW unless its known that a signal will be sent anyways (e.g. for location services).

Implicitly, the list of resources-IDs implies that all resources are needed to continue service of a PDN connection. In a reliability model, this is a simple "series". Dedicated disjoint mated pairs may always be reported as a single resource-ID. However, complications may result when replication is distributed (e.g., A is the backup for some resources on both B and C). A more flexible approach is desirable.

In one embodiment of the present invention, a distributed replication may be handled by providing the reliability model in the message. Specifically, current examples implicitly assume a serial reliability model. For example, [resource ID1, resource ID2, resource ID3 . . . ] is replaced by [AND, resource ID1, resource ID2, resource ID3, . . . ]. In this embodiment, the reliability model is in LISP style to indicate the serial dependency. Two replicated resources may be represented by: [OR, resource ID1, resource ID2]. In another example, a more complicated structure may be [AND, resource ID3, [OR, resource ID1, resource ID1], . . . ] or [AND, [OR, resource ID3,resource ID4], [OR, resource ID1, resource ID1], . . . ].

Nodes report their internal reliability model in this manner or similar in the signaling messages for a PDN connection. Links between nodes may assume an AND action. For example, the links may assume [AND, PGW-1-model, SGW-1-model, MME-1-model]. However, in this embodiment, internal details of the node may be more exposed. A vendor may choose to handle that by defining more resources (e.g., direct product to replace the OR). The Boolean expressions may be simplified by the receiver.

The addition of the resource-IDs to the PDN connection records provides a fairly minimal memory impact. However, preferably, the number of resource-IDs is kept at a reasonable number, such as four per node with a maximum of eight being stored. The main impact is on reverse lookup records if used. Brute force searches can be used since it occurs only at failures.

In the following analysis for reverse lookup, "coarse" resource-IDs are partially assumed. A hash of hash may be used with two index keys (nodeID, resource-ID). (HashMap in Java, ghash in glib for C, etc.). In another embodiment, a hash function on the two arguments directly to an array. At the hash table value, there may be a doubly linked list of pointers to all the PDN connections with doubly linked references to/from the PDN connections. The double linking allows an order of one insertion and deletion cost on the lists. This is imperative when the list sizes are in the tens of thousands or more.

If the sorting by restart count is desired, then an array with a small modulo on the restart count may be inserted between the hash layer and the doubly linked list layer. The keys/hashes above are representative for a single CPU system only.

In another embodiment, if a range of resource-IDs were to be sent, the maximum and minimum values may also be indicated. Alternatively, if a node has a tree hierarchy, such as a one supervision board controlling the control boards, the resource-ID value may use the bottom of the tree, wherein the most significant bits indicate the top of the tree without actually storing the top of the tree explicitly. This is analogous to a SIGCOMP partial state or an IP subnet.

The present invention provides many advantages over existing systems. The present invention reduces signaling between nodes when a partial failure impacting many PDN connections occurs. The present invention also provides flexibility for use with a wide variety of vendors.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of releasing resources in a telecommunications network, the method comprising the steps of:
in the presence of a fault, receiving, by a neighboring peer node, an indication of the fault and a resource-ID of a malfunctioning internal resource, the internal resource being associated with a respective Packet Data Network (PDN) connection to another node;
determining a malfunctioning internal resource in a PDN connection record by using the resource-ID, the resource-ID being a reference to the internal resource within another node, the internal reference being associated with a respective PDN connection of the other node; and releasing the respective PDN connection as a function of the receiving and determining;

wherein at least a portion of the resource-ID is distinct from an external identifier associated with the node that comprises the malfunctioning internal resource.

2. The method according to claim 1 further comprising relaying, by the neighboring peer node, the resource-ID to a next neighboring peer node along with a resource-ID of the next neighboring peer node associated with an internal resource allocated by the next neighboring peer node.

3. The method according to claim 2 wherein:
the node is a Mobile Management Entity;
the neighboring peer node is a Serving Gateway; and
the next neighboring peer node is a PDN Gateway.

4. The method according to claim 1 wherein the step of releasing further comprises:
sending a response message to the node acknowledging receipt of the indication of the fault and a resource-ID; and
sending a resource-ID of the neighboring node.

5. The method according to claim 1, further comprising the step of sending the indication of the fault and the resource-ID to a second peer node, the sending being performed via a new General Packet Radio Service (GPRS) Tunneling Protocol version 2 (GTPv2) message.

6. The method according to claim 1, wherein if an entry in the PDN connection record does not exist for the resource-ID, the method further comprising:
storing the resource-ID in the PDN connection record within the neighboring peer node:
creating a lookup entry for a node identification and resource-ID, wherein the lookup entry is a key of the PDN connection;
sending a message for identifying the node and malfunctioning internal resource; and
mapping a pointer to a specific PDN connection.

7. The method according to claim 1 wherein the step of receiving further comprises delaying the receiving by a random time period.

8. The method according to claim 1 wherein the receiving further comprises receiving an Information Element to carry the resource-ID of the malfunctioning internal resource.

9. A system for releasing resources in a telecommunications network, the system comprising:
a node configured to assign a resource-Identification (ID) to an internal resource within the node;
the node further configured to allocate at least one internal resource by the node for a specific Packet Data Network (PDN) connection;
the node configured to send a first message containing a resource-ID of the allocated internal resource to a neighboring peer node, the first message being any PDN or UE specific message establishing or modifying a PDN connection on the node, which comprises a restart count of the allocated internal resource, wherein the restart count is per GTPv2 node or per GTPv2 path;
the neighboring peer node configured to store the resource-ID of the first message in a PDN connection record within the node;
the node further configured to determine a malfunction of the allocated internal resource of the node; and
the node configured to send a second message containing the resource-ID of the malfunctioning internal resource to the neighboring peer node; and
the neighboring peer node configured to respond to the second message.

10. The system according to claim 9 wherein the neighboring peer node is configured to relay the resource-ID of the first message to a next neighboring peer node with a resource-ID of the neighboring peer node associated with an internal resource allocated by the neighboring peer node, wherein more distant neighboring peers can be included by further relay.

11. The system according to claim 10 wherein:
the node is a Mobile Management Entity or SGSN;
the neighboring peer node is a Serving Gateway; and
the next nearest neighbor peer node is a PDN Gateway.

12. The system according to claim 10 wherein:
the node is a Serving Gateway, and at least one of the neighboring peer node, the next neighboring peer node, or one of the more distant neighboring peers is a Mobile Management Entity, SGSN, or PGW.

13. The system according to claim 10 wherein:
the node is a PDN Gateway, the neighboring peer node is a Serving Gateway, and the next neighboring peer node is a Mobile Management Entity or SGSN.

14. The system according to claim 9 wherein the neighboring node is further configured to send a response message to the first node acknowledging receipt of the second message and the neighboring node being further configured to release the PDN connection.

15. The system according to claim 9 wherein the neighboring peer node is further configured to relay the second message as a new GTPv2 message to a next neighboring peer node.

16. The system according to claim 9 wherein the neighboring peer node is further configured to store the resource-ID in a PDN connection record within the neighboring peer node; and
the neighboring peer node is further configured to create a lookup entry for a node identification and resource-ID, wherein the lookup entry is a key in the PDN connection and the key maps to a pointer to a specific PDN connection.

17. The system according to claim 16, wherein the key is contained in the second message to identify the node and malfunctioning internal resource.

18. The system according to claim 9 wherein the first message comprises a restart count of the allocated internal resource, as well as the case where the restart counter is per GTPv2 node or per GTPv2 path.

19. A method for releasing resources in a telecommunications network, the method comprising:
communicating with a nearest neighbor peer node in the telecommunications network;
assigning a resource-Identification (ID) to an internal resource within the node;
allocating at least one internal resource by the node for a specific Packet Data Network (PDN) connection;
sending a first message containing a resource-ID of the allocated internal resource to the nearest neighbor peer node, the first message is a Created Session Request Message and includes a restart count of the allocated internal resource, or any PDN or UE specific message establishing or modifying a PDN connection on a node;
determining a malfunction of the allocated internal resource of the node; and
sending a second message containing the resource-ID of the malfunctioning internal resource to the nearest neighbor peer node, the second message being a new GTPv2 message or the resource-ID is piggybacked in an existing message;

wherein at least a portion of the resource-ID is distinct from an external identifier associated with the node that comprises the malfunctioning internal resource.

* * * * *

UNITED STATES PATENT AND TRADEMARK OFFICE
CERTIFICATE OF CORRECTION

Page 1 of 2

PATENT NO. : 9,992,694 B2
APPLICATION NO. : 14/547330
DATED : June 5, 2018
INVENTOR(S) : Campbell It is certified that error appears in the above-identified patent and that said Letters Patent is hereby corrected as shown below:

In Fig. 14, Sheet 15 of 17, for Step "352", in Line 3, delete "[SGW-1, SGW-1's_restart_count, 1,4],)" and insert -- [SGW-1, SGW-1's_restart_count, 1,4]) --, therefor.

In Column 1, in Title, Line 2, delete "TELECOMMUNCATIONS" and insert -- TELECOMMUNICATIONS --, therefor.

In Column 1, Line 9, delete ""A System and" and insert -- "System and --, therefor.

In Column 1, Line 10, delete "Network,"" and insert -- Network," now Pat. No. 8,908,497, --, therefor.

Figure 1A:
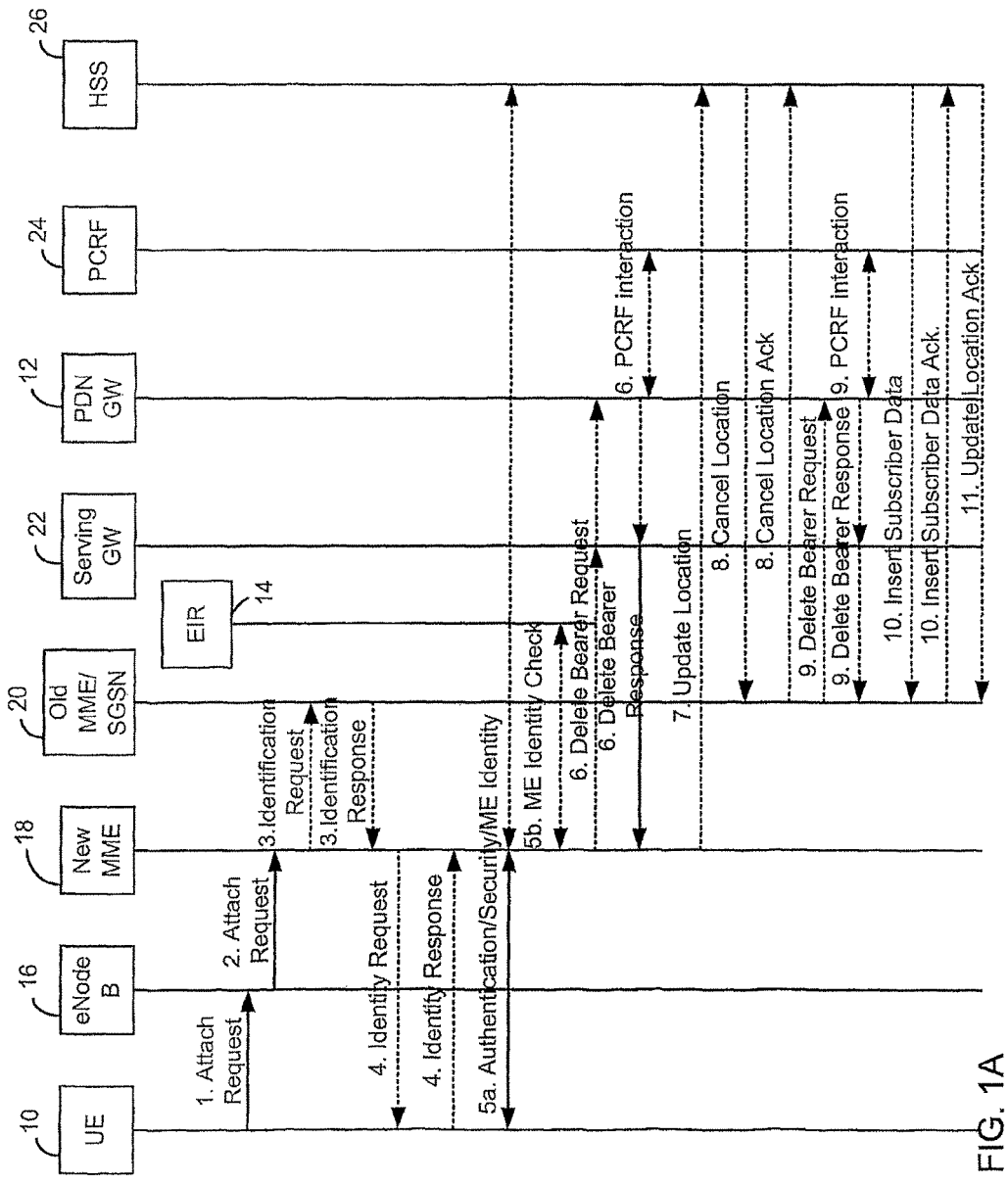
FIGS. 1A and 1B (Prior Art) are signaling diagrams illustrating a power up (initial attach) procedure in LTE/SAE in an existing system.
Figure 1B:
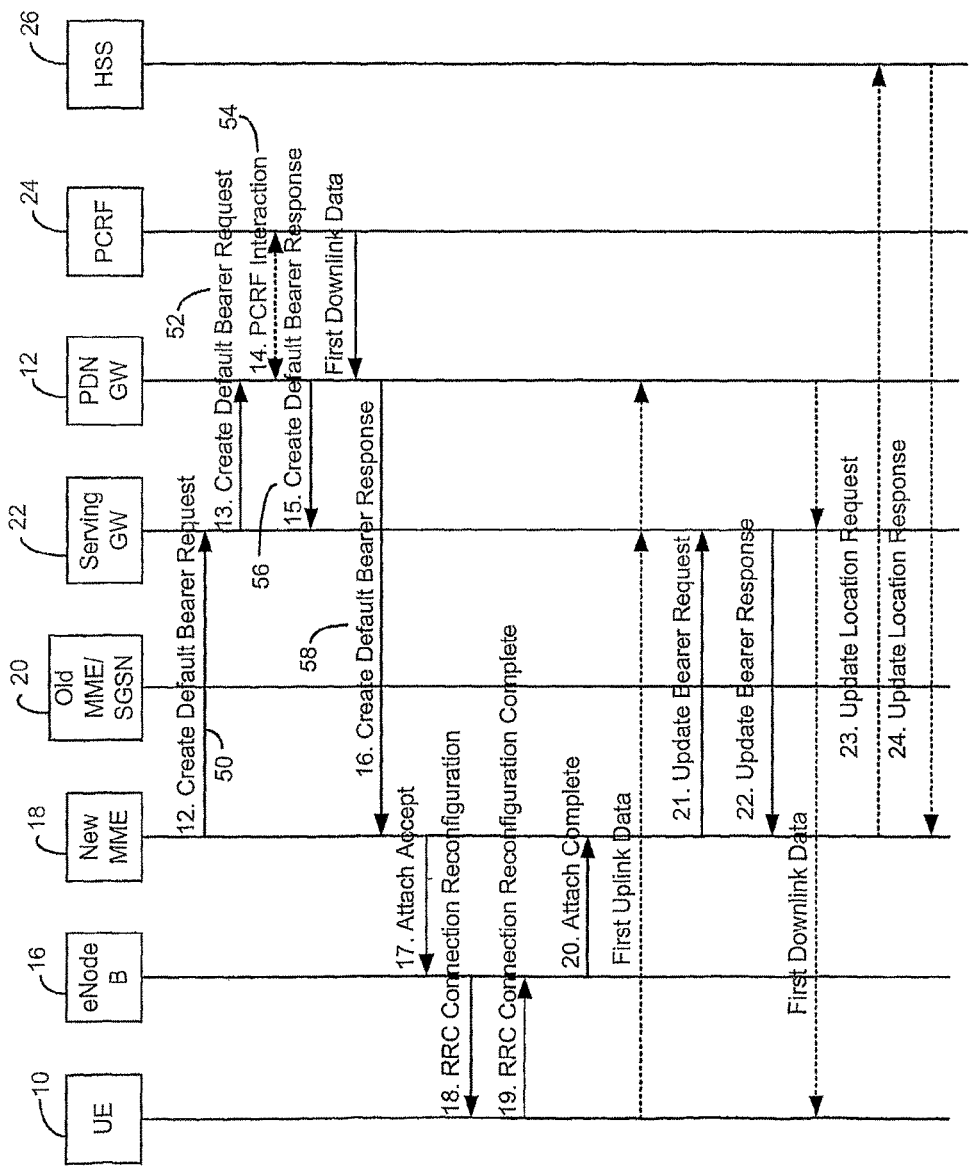
Figure 2:
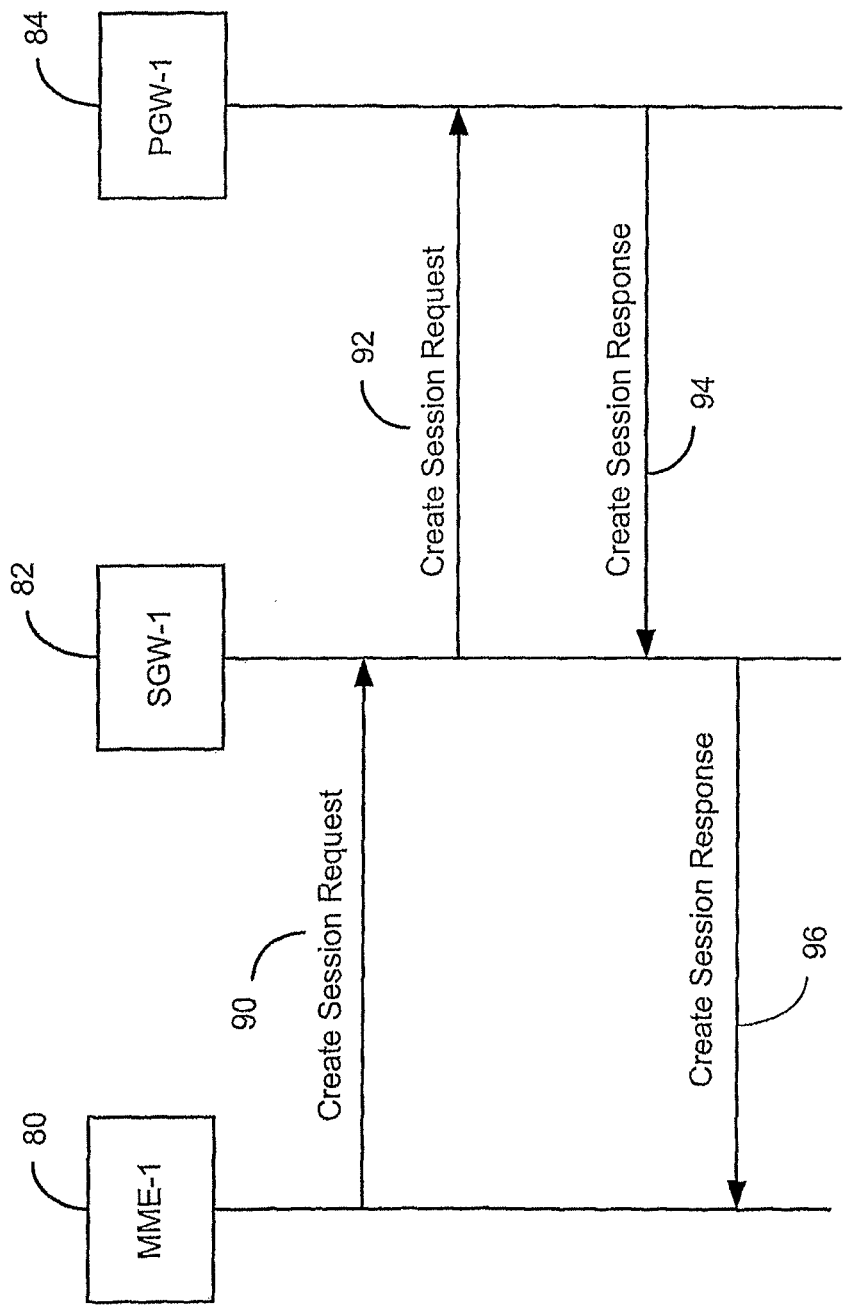
FIG. 2 (Prior Art) is a signaling diagram illustrating an attach procedure for LTE with all GTP.
Figure 3:
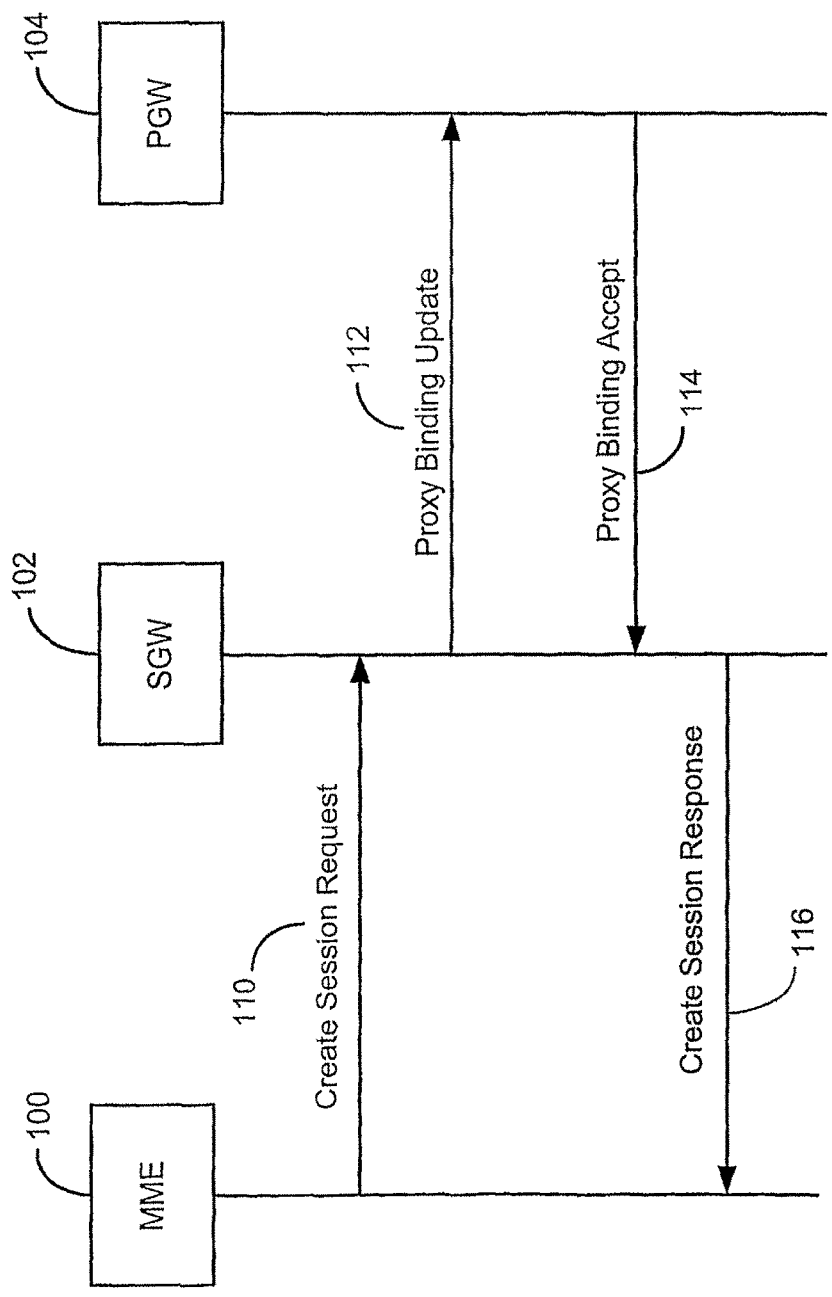
FIG. 3 (Prior Art) is a signaling diagram illustrating an attach procedure for LTE with PMIP.
Figure 4:
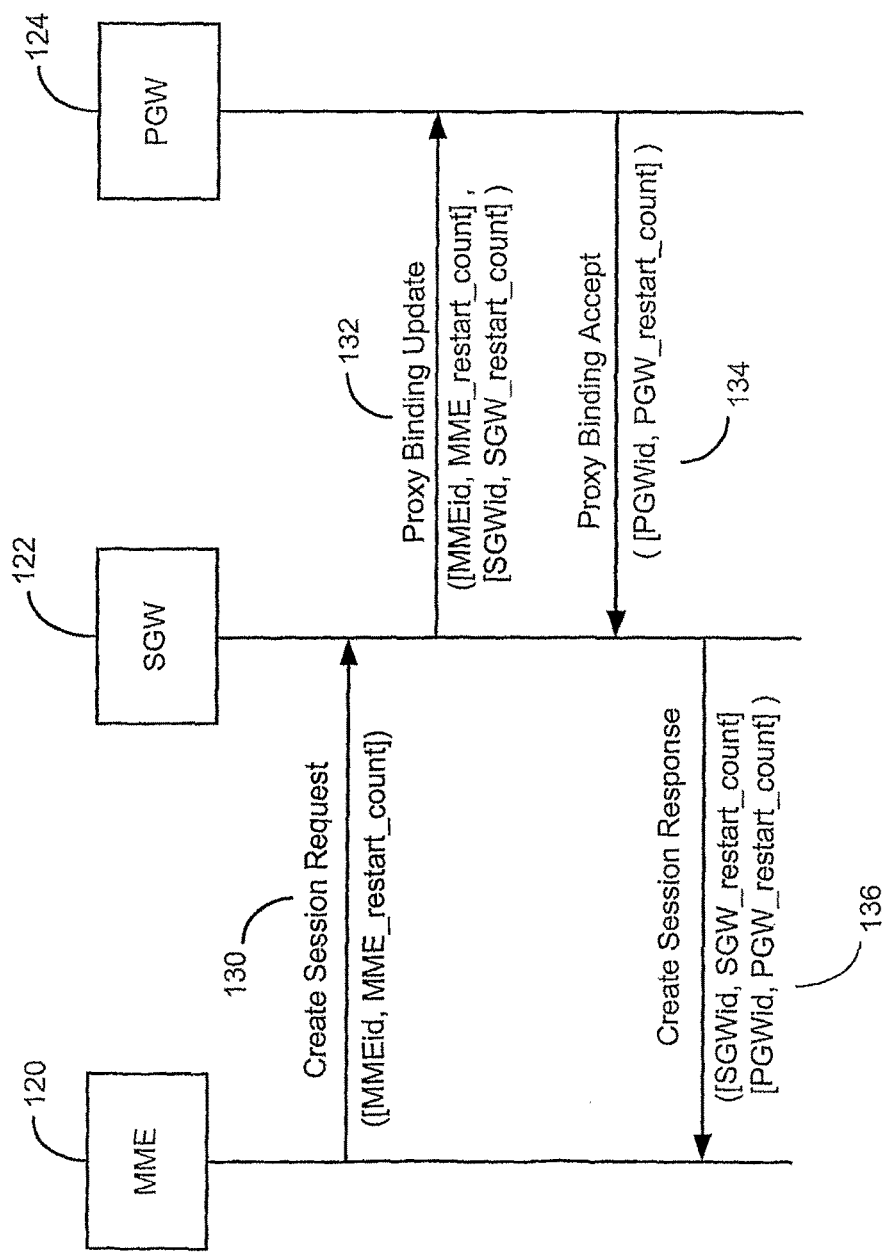
FIG. 4 (Prior Art) is a signaling diagram illustrating the basic information necessary to allow PDN connection when a node fails.
Figure 5:
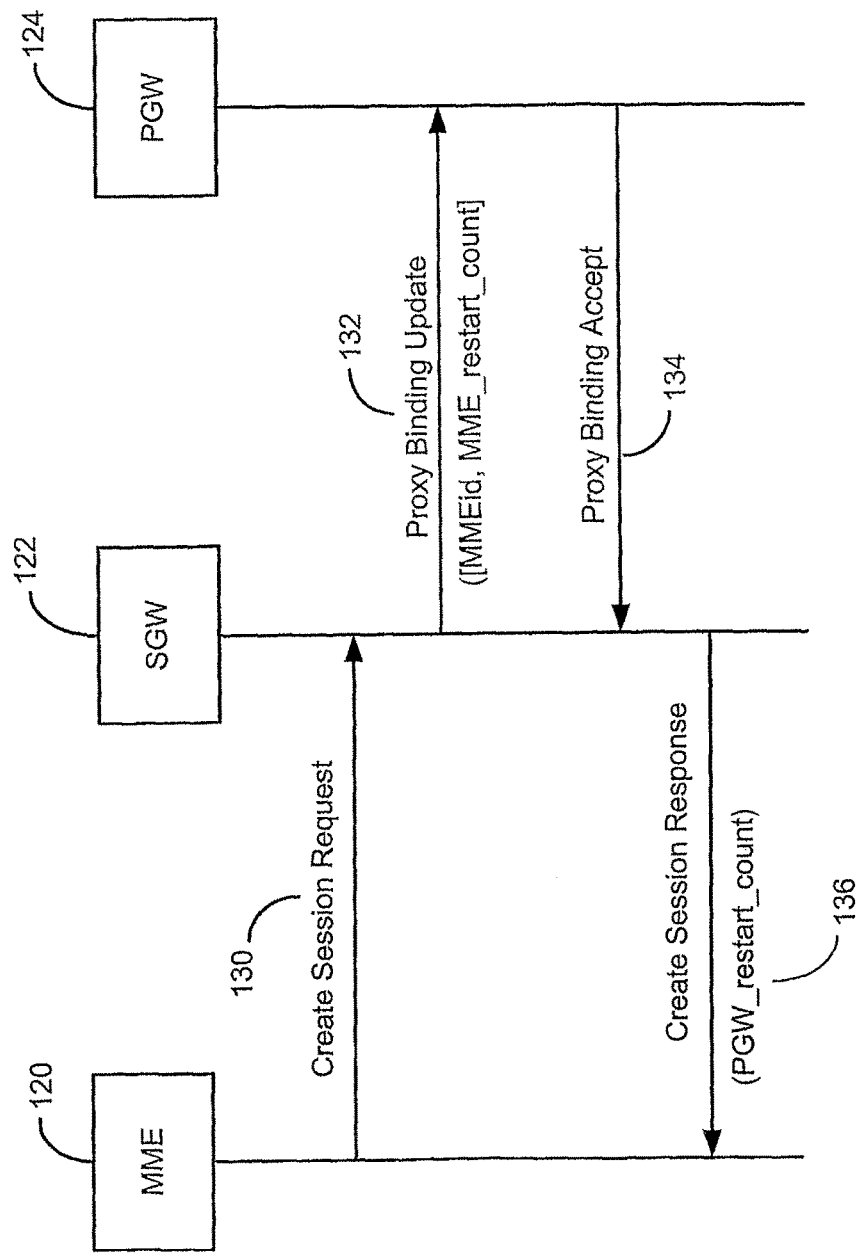
FIG. 5 (Prior Art) is a signaling diagram illustrating the minimal data needed in the messages.

In Column 2, Line 28, delete "FIGS. 1 and 1B" and insert -- FIGS. 1A and 1B --, therefor.

In Column 3, Line 42, delete "etc. . . . ." and insert -- etc. --, therefor.

In Column 4, Lines 22-23, delete "SGW restart count" and insert -- SGW_restart_count --, therefor.

In Column 6, Line 37, delete "Forloop" and insert -- Forlopp --, therefor.

In Column 6, Line 48, delete "Forloop" and insert -- Forlopp --, therefor.

In Column 8, Line 67, delete "PGW_resourceID2, . . . ]" and insert -- PGW_resourceID2, . . .]) --, therefor.

In Column 9, Line 30, delete "MMEid," and insert -- ([MMEid, --, therefor.

In Column 9, Line 32, delete "MMEid," and insert -- ([MMEid, --, therefor.

In Column 12, Lines 45-46, delete "([PGW-1, PGW-1's_restart_count,2,6]" and insert -- ([PGW-1, PGW-1's_restart_count,2,6]) --, therefor.

In Column 14, Line 35, delete "3GPP" and insert -- 3GPP. --, therefor.

Signed and Sealed this
Twenty-fifth Day of September, 2018

Andrei Iancu
*Director of the United States Patent and Trademark Office*

CERTIFICATE OF CORRECTION (continued)
U.S. Pat. No. 9,992,694 B2

In Column 15, Line 22, delete "{restart count of resource ID2, resource ID2, . . . )." and insert -- {restart count of resource ID2, resource ID2}, . . . ). --, therefor.

In Column 17, Line 33, in Claim 6, delete "node:" and insert -- node; --, therefor.

In Column 17, Line 64, in Claim 9, delete "node; and" and insert -- node; --, therefor.